United States Patent [19]

Yamamoto et al.

[11] Patent Number: 5,543,901
[45] Date of Patent: Aug. 6, 1996

[54] ELECTROPHOTOGRAPHIC DEVELOPING METHOD USING MAGNETIC DEVELOPING MATERIAL AND APPARATUS EMPLOYED THEREFOR

[75] Inventors: Hajime Yamamoto, Ibaraki; Hiroshi Terada, Ikoma, both of Japan

[73] Assignee: Matsushita Electric Industrial Co., Ltd., Osaka, Japan

[21] Appl. No.: 480,079

[22] Filed: Jun. 7, 1995

Related U.S. Application Data

[63] Continuation of Ser. No. 919,905, Jul. 27, 1992, Pat. No. 5,488,465.

[30] Foreign Application Priority Data

| Jul. 26, 1991 | [JP] | Japan | 3-187272 |
|---|---|---|---|
| Sep. 17, 1991 | [JP] | Japan | 3-236061 |
| Dec. 27, 1991 | [JP] | Japan | 3-345990 |
| Dec. 27, 1991 | [JP] | Japan | 3-346128 |
| Dec. 27, 1991 | [JP] | Japan | 3-346132 |
| Feb. 4, 1992 | [JP] | Japan | 4-018616 |

[51] Int. Cl.$^6$ ................................. G03G 13/00
[52] U.S. Cl. .................. 355/246; 118/657; 355/211; 355/251; 355/261
[58] Field of Search ................... 355/270, 269, 355/211, 210, 251, 256, 260, 261, 265, 246; 118/657, 658, 661

[56] References Cited

U.S. PATENT DOCUMENTS

| 3,105,770 | 10/1963 | Lehmann et al. . |
|---|---|---|
| 3,333,572 | 8/1967 | Olden . |
| 3,866,574 | 2/1975 | Hardennrook et al. . |
| 3,989,077 | 11/1976 | Kompe . |
| 4,091,404 | 5/1978 | Schörnig et al. . |
| 4,378,754 | 4/1983 | Rasekhi et al. . |
| 4,395,476 | 7/1983 | Kanbe et al. . |
| 4,473,627 | 9/1984 | Kanbe et al. . |
| 4,610,527 | 9/1986 | Cherbuy et al. . |
| 4,769,676 | 9/1988 | Mukai et al. . |
| 4,843,424 | 6/1989 | Oda et al. . |
| 4,885,221 | 12/1989 | Tsuneeda . |

(List continued on next page.)

FOREIGN PATENT DOCUMENTS

| 0509441 | 10/1992 | European Pat. Off. . |
|---|---|---|
| 57-23986 | 2/1982 | Japan . |
| 57-29074 | 2/1982 | Japan . |
| 58-9155 | 1/1983 | Japan . |
| 58-16269 | 1/1983 | Japan . |
| 58-009155 | 1/1983 | Japan . |
| 60-117276 | 6/1985 | Japan . |
| 60-117275 | 6/1985 | Japan . |
| 61-3153 | 1/1986 | Japan . |
| 61-270777 | 12/1986 | Japan . |
| 61-27077 | 12/1986 | Japan . |
| 63-306485 | 12/1988 | Japan . |
| 1-239570 | 9/1989 | Japan . |
| 5518657 | 2/1990 | Japan . |

*Primary Examiner*—Arthur T. Grimley
*Assistant Examiner*—Shuk Yin Lee
*Attorney, Agent, or Firm*—Ratner & Prestia

[57] ABSTRACT

An electrophotographic method and an apparatus employed for effecting the method, in which a photoreceptor drum having a fixed magnet member in it is employed. After forming an electrostatic latent image on the surface of the photoreceptor drum, the photoreceptor surface is brought into contact with the magnetic developing material within a developing material hopper so as to attract the developing material onto the surface of the photoreceptor drum by magnetic force. When the photoreceptor surface further passes an electrode roller, the toner remains only at the image portion for development into a visible toner image. As a force for removing the magnetic developing material from the photoreceptor surface, a resultant force of a magnetic force connecting the photoreceptor drum and the electrode roller and an electrostatic force connecting the photoreceptor drum and the electrode roller, is employed. Thus, the present invention provides the novel electrophotographic method and the apparatus for executing the method, which is simple in construction and a compact in size, and capable of providing images with a high resolution.

9 Claims, 10 Drawing Sheets

U.S. PATENT DOCUMENTS

| | | |
|---|---|---|
| 4,913,088 | 4/1990 | Kanbe et al. . |
| 5,032,485 | 7/1991 | Kanbe et al. . |
| 5,044,310 | 9/1991 | Kanbe et al. . |
| 5,138,387 | 8/1992 | Sate et al. . |
| 5,204,719 | 4/1993 | Bares . |
| 5,229,825 | 7/1993 | Yousey et al. . |
| 5,298,949 | 3/1994 | Yamamoto et al. . |

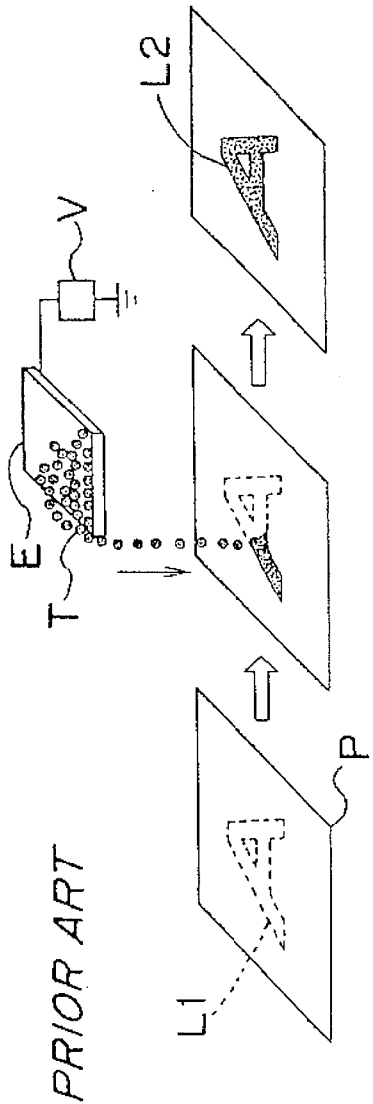
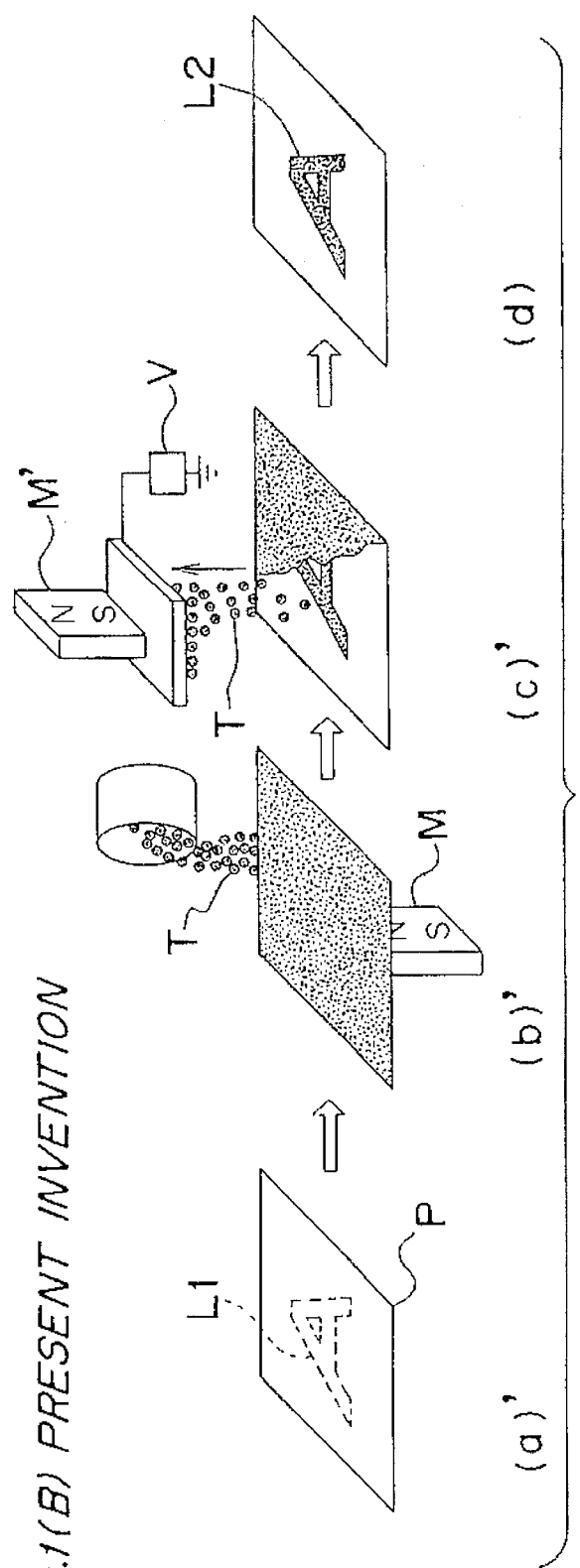
Fig.1(A) PRIOR ART
Fig.1(B) PRESENT INVENTION

ELECTROPHOTOGRAPHIC DEVELOPING METHOD USING MAGNETIC DEVELOPING MATERIAL AND APPARATUS EMPLOYED THEREFOR

This application is a continuation of application Ser. No. 07/919,905, filed Jul. 27, 1992, now U.S. Pat. No. 5,488,465.

BACKGROUND OF THE INVENTION

The present invention generally relates to electrophotography, and more particularly, to an electrophotographic process and an apparatus employed therefor which may be applied to a printer, facsimile device or the like.

Conventionally, in the field of electrophotographic developing method, there have been proposed the cascade developing process, touch-down developing process, and jumping developing method, etc., among which the cascade developing process disclosed, for example, in the U.S. Pat. No. 3,105,770 is known as a developing process in which a developing material is directly sprinkled over a photosensitive member or photoreceptor. Such a cascade developing method is the developing process applied to a first copying apparatus for a practical application based on the electrophotographic method.

Moreover, there is another developing process in which the developing is effected by causing a mono-component toner to fly, through impression of A.C. bias onto a developing roller as disclosed for example, in U.S. Pat. No. 3,866,574, in which it is stated that the A.C. bias to be applied to the developing roller is used for the purpose of activating the movement of toner, and the toner reaches the image portion by flying, while some of the toner is returned in the course of flying back to the non-image portion.

Furthermore, as a developing method in which the technique for applying such A.C. bias has been improved, there has been proposed a jumping developing method as disclosed in Japanese Patent Publication Tokkosho No. 63-42256, which is so arranged that the toner supported by a toner supporting member is carried up to a developing section, where the toner is caused to adhere to an image portion of a photosensitive member by an A.C. bias. The technical concept in this Japanese Patent Publication Tokkosho No. 63-42256 is different from that of the above U.S. Pat. No. 3,866,574 in that the toner is subjected to reciprocating movement at the image portion and the non-image portion.

As is well known in this field of technique, the cascade developing process is weak in the reproduction of solid images, with a further problem that an apparatus therefor tends to be large and complicated. Moreover, the developing apparatus of the U.S. Pat. No. 3,866,574 has such disadvantages that a high accuracy is required for the apparatus, with complicated constructions, and a consequent high cost. In the jumping developing process, since the photosensitive member is developed by the toner support member supporting the toner layer, it has been indispensable that an extremely uniform thin layer is formed on the toner supporting member in order to obtain a high quality image. Additionally, in the above process, the so-called "sleeve ghost" phenomena took place in which hysteresis of a former image often remains on the toner thin layer of the toner support member, thus appearing as an after-image in the resultant image, with further disadvantages that the apparatus therefor is complicated in construction, thus resulting in high cost.

SUMMARY OF THE INVENTION

Accordingly, an essential object of the present invention is to provide an electrophotographic method which is capable of providing images at high quality.

Another object of the present invention is to provide an electrophotographic apparatus for effecting the electrophotographic method as described above, which is simple in construction and capable of copying with a high speed process.

A further object of the present invention is to provide an electrophotographic apparatus of the above described type which is compact in size, with a long life, and free from soiling by toner within the apparatus.

In accomplishing these and other objects, according to one aspect of the present invention, there is provided an electrophotographic method which includes a first step for causing a magnetic developing material to adhere onto a surface on electrostatic latent image holding member by moving the electrostatic latent image holding member enclosing therein a fixed magnet means, so as to pass through a developing material hopper having the magnetic developing material, and a second step for removing unnecessary magnetic developing material from the latent image holding member by confronting said latent image holding member with an electrode roller provided through a gap with respect to the surface of said latent image holding member, wherein a force required for removing the magnetic developing material from said latent image holding member in said second step is of a resultant force of a magnetic force and an electrostatic force connecting said latent image holding member with said electrode roller.

In another aspect of the present invention, there is also provided an electrophotographic apparatus which includes an electrostatic latent image holding member enclosing a fixed magnet therein and adapted to be moved, a supply means for supplying a magnetic developing material onto a surface of said latent image holding member, a developing roller disposed at a position confronting at least part of said fixed magnet, through a predetermined gap with respect to the surface of said latent image holding member, and adapted to rotate in its advance in a direction opposite to the direction of rotation of said electrode roller, and further, a voltage impressing means for impressing a voltage for removing toner at a non-image portion on said latent image holding member, to said electrode roller.

In a further aspect of the present invention, the electrophotographic apparatus includes an electrostatic latent image holding member enclosing a fixed magnet means therein and adapted to be moved, a latent image forming means for forming an electrostatic latent image on said latent image holding member, a developing material hopper confronting the surface of said latent image holding member and containing a magnetic developing material therein so as to cause the developing material to be magnetically attracted and adhere onto the surface of said latent image holding member by an action of said fixed magnet means, and an electrode roller provided through a gap with respect to the surface of said latent image holding member so as to be applied with an A.C. voltage, and adapted to rotate in a direction of advance opposite to that of said latent image holding member, wherein position of magnetic poles of said magnet means within said latent image holding member is at an upstream side from the closest position of said latent image holding member with respect to said electrode roller.

In still another aspect of the present invention, the electrophotographic apparatus includes an electrostatic latent image holding member enclosing a fixed magnet, A therein and adapted to be moved, a latent image forming means for forming an electrostatic latent image on said latent image holding member, a developing material hopper confronting the surface of said latent image holding member and containing a magnetic developing material therein so as to cause the developing material to be magnetically attracted and adhere onto the surface of said latent image holding member by an action of said fixed magnet A, and an electrode roller for removing toner at a non-image portion on said latent image holding member, wherein said electrode roller is constituted by a non-magnetic member enclosing therein another magnet B having polarity opposite to that of said magnet A, position of magnetic poles of said magnet means within said latent image holding member is at an upstream side from the closest position of said latent image holding member with respect to said electrode roller, with position of magnetic poles of said magnet B within said electrode roller being at the closest position between said latent image holding member and said electrode roller or at a downstream side therefrom, and said electrode roller is provided through a gap with respect to said latent image holding member, and applied with an A.C. voltage.

In a still further aspect of the present invention, the electrophotographic apparatus includes an electrostatic latent image holding member enclosing a fixed magnet means therein and adapted to be moved, a latent image forming means for forming an electrostatic latent image on said latent image holding member, a developing material hopper confronting the surface of said latent image holding member and containing a magnetic developing material therein so as to cause the developing material to be magnetically attracted and adhere onto the surface of said latent image holding member by an action of said fixed magnet means, and an electrode roller for removing toner at a non-image portion on said latent image holding member, wherein said electrode roller provided through a gap with respect to the surface of said latent image holding member is applied with an A.C. voltage, and adapted to rotate in its advancing direction, opposite to that of said latent image holding member, with its moving speed being equal to or slower than that of said latent image holding member.

In another aspect of the present invention, the electrophotographic apparatus includes an electrostatic latent image holding member enclosing a fixed magnet means therein and adapted to be moved, a charging means for charging said latent image holding member, a latent image forming means for forming an electrostatic latent image on said latent image holding member, a developing material hopper confronting the surface of said latent image holding member and containing a magnetic developing material therein so as to cause the developing material to be magnetically attracted and adhere onto the surface of said latent image holding member by an action of said fixed magnet means, and an electrode roller provided through a gap with respect to said the surface of said latent image holding member so as to be applied with an A.C. voltage for reversal development of said electrostatic latent image, charging width of said latent image holding member by said charging means being larger than magnetizing width of said fixed magnet means.

In still another aspect of the present invention, the electrophotographic apparatus includes an electrostatic latent image holding member enclosing a fixed magnet means therein and adapted to be moved, a latent image forming means for forming an electrostatic latent image on said latent image holding member, a developing material hopper confronting the surface of said latent image holding member and containing a magnetic developing material therein so as to cause the developing material to be magnetically attracted and adhere onto the surface of said latent image holding member by an action of said fixed magnet means, and an electrode roller provided through a gap with respect to the surface of said latent image holding member so as to be applied with an A.C. voltage, and adapted to rotate in a direction of advance, opposite to that of said latent image holding member, wherein said fixed magnet means has the maximum flux density larger than 300 gauss on the surface of said latent image holding member.

In a further aspect of the present invention, the electrophotographic apparatus includes an electrostatic latent image holding member enclosing a fixed magnet means therein and adapted to be moved, a developing material hopper confronting the surface of said latent image holding member and containing a magnetic developing material therein so as to cause the developing material to be magnetically attracted and adhere onto the surface of said latent image holding member by an action of said fixed magnet means, add a rotatable electrode roller provided through a gap with respect to the surface of said latent image holding member so as to be applied with a voltage for collecting unnecessary developing material on said latent image holding member, wherein said developing material hopper has a width larger than 5 mm at its portion confronting the surface of said latent image holding member in the direction of movement of said latent image holding member.

In a still further aspect of the present invention, the electrophotographic method includes a charging step for successively charging an electrostatic latent image holding member by moving said latent image holding member enclosing therein fixed magnet means, a latent image forming step for forming an electrostatic latent image on said latent image holding member, a developing material supply step for magnetically attracting and adhering a magnetic developing material onto the surface of the latent image holding member by passing said holding member through a developing material hopper having the magnetic developing material therein, and a developing step for subjecting the electrostatic latent image to reversal development by confronting the latent image holding member with an electrode roller provided through a gap with respect to the surface of said latent image holding member and applied with a voltage, wherein timing of the voltage impression for effecting the reversal development in said developing step is set at passing of the developing step for the charged region of said latent image holding member.

By the arrangement according to the present invention as described above, there are presented an electrophotographic method capable of providing images at high quality in an efficient manner, and a compact electrophotographic apparatus for executing said method which can cope with a high speed processing and is free from soiling by toner within the apparatus, with a consequent long life.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 1(A) and 1(B) are diagrams for explaining a difference in the technical concept between a conventional electrophotographic method and an electrophotographic method according to the present invention.

DETAILED DESCRIPTION OF THE INVENTION

Figure 2:
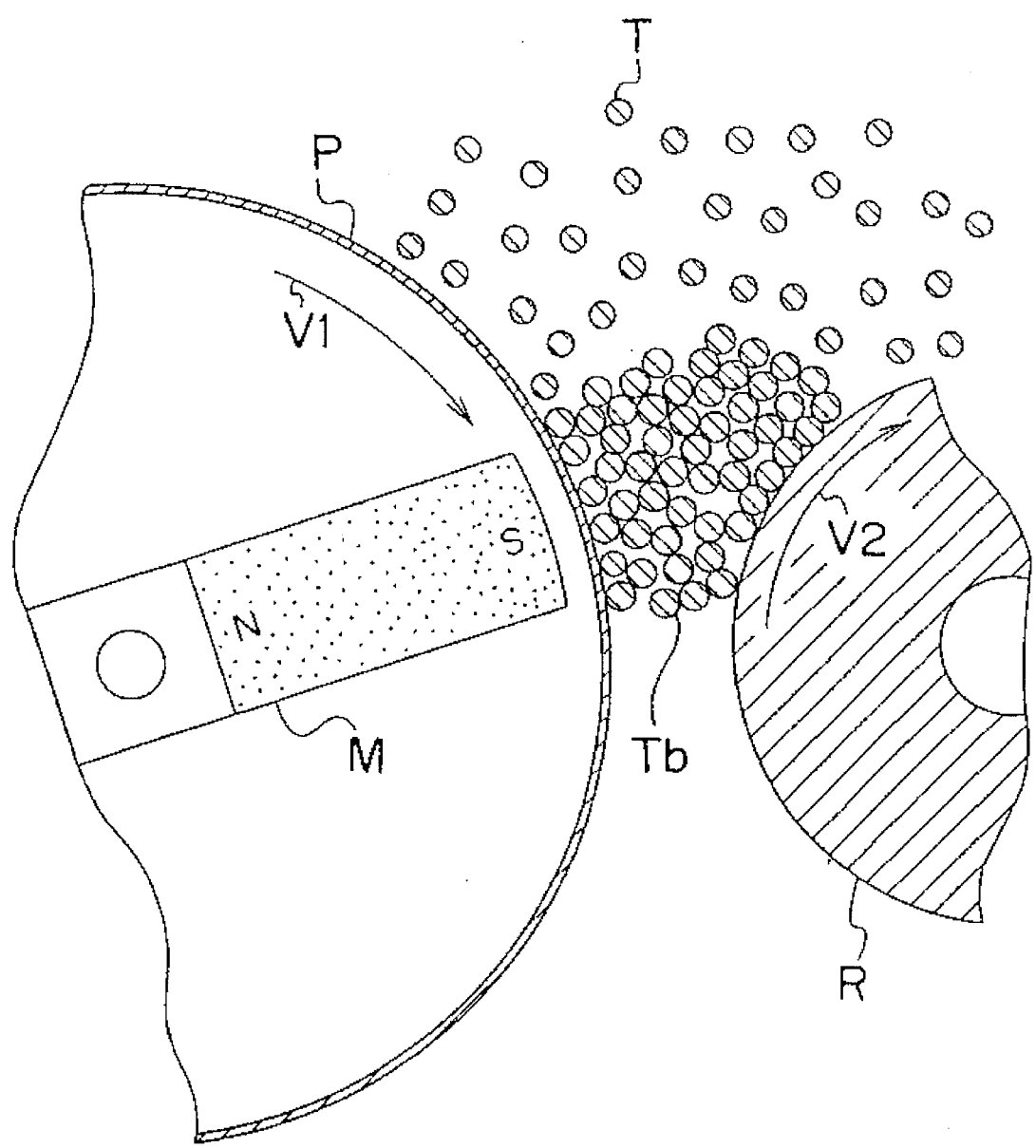
FIGS. 2 and 3 are schematic side sectional diagrams for explaining functions of the electrophotographic method of the present invention.

Before the description of the present invention proceeds, it is to be noted here that like parts are designated by like reference numerals throughout the accompanying drawings.

The present invention is so arranged that, through employment of an electrostatic latent image holding member which is incorporated with or encloses a fixed or stationary magnet therein, a developing material is sprinkled over the electrostatic latent image holding member (referred to as the latent image holding member hereinafter) on which an electrostatic latent image is formed to cause the developing material to be magnetically attracted onto the latent image, which is transported to an electrode roller portion to be applied with an A.C. bias, thereby to remove the toner at non-image portion of the latent image holding member by electrostatic force and magnetic force. More specifically, according to the present invention, improvements at two points, i.e. provision of the magnet within the latent image holding member, and impression of the high A.C. voltage to the electrode, are added to the cascade developing method for a more compact size and a higher performance. In the present invention, the developing has been almost completed when the toner is first sprinkled over the latent image holding member. The electrode roller portion is adapted to cause the toner to be circulated within a developing material hopper, while simultaneously, it collects the toner at the non-image portion of the electrostatic latent image.

Referring now to the drawings, particularly to FIGS. 1(A) and 1(B), technical concept of the present invention (FIG. 1(B)) will be explained hereinafter in comparison with the conventional process (FIG. 1(A)).

In the conventional process shown in FIG. 1(A), (a) to (c), toner T is sprinkled from a developing electrode E applied with an A.C. voltage V, over the surface of an electrostatic latent image holding member P formed with an electrostatic latent image L1 so as to cause the toner T to adhere to the image formed portion L1, thereby to obtain a toner image L2 as shown at (c) in FIG. 1(A).

On the other hand, according to the present invention, a magnetic developing material T is once caused to adhere onto an entire surface of the electrostatic latent image holding member P by a magnetic force of magnet M as shown at (a)' and (b)' in FIG. 1(B), and thereafter, the toner T is removed from the non-image formed portion of the holding member P by a magnetic force of the magnet M' and an electrostatic force by the voltage source V as shown at (c)' in FIG. 1(B) to obtain the toner image L2 as at (d) in FIG. 1(B), and from the above viewpoints, the conventional practice in FIG. 1(A) may be regarded as the "developing method to cause the toner to adhere to the image formed portion", while the process of the present invention in FIG. 1(B), as the "developing method to peel off the toner at the non-image portion".

From the difference in the technical concept as referred to above, there will be differences in construction as follows between the electrode roller of the present invention and the prior at, for example, the developing roller disclosed in Japanese Patent Publication Tokkosho No. 63-42256 referred to earlier.

(1) According to the present invention, the electrostatic latent image holding member is arranged to carry the developing material from the developing material hopper to the developing section.

(2) In the prior art developing roller, the surface thereof supporting the toner layer confronts the electrostatic latent image holding member at all times, while in the electrode roller of the present invention, the uncovered surface thereof faces the electrostatic latent image holding member at all times.

(3) In the prior art, the developing roller and the electrostatic latent image holding member are moved at the same speed in the same direction, whereas in the present invention, the electrode roller is rotated in the opposite direction.

More specifically, according to the present invention, the electrostatic latent image holding member is arranged to carry the developing material from the developing material hopper to the developing section, and the toner collected by the uncoverd electrode roller is immediately removed from the developing section through the rotation in the opposite direction.

Due to the difference in the construction as described above, differences in the functions and effects as follows take place.

If it is so arranged that the electrostatic latent image holding member and the developing roller are adapted to move at the same speed in the same direction as in Japanese Patent Publication Tokkosho No. 63-42256, the toner returned from the latent image holding member to the roller by the reciprocating motion may be again returned to the original image portion. However, if the roller is arranged to rotate in the opposite direction as in the present invention, the toner can not be returned to the same position, due to the fact that once the toner has been moved onto the roller, the surface of the latent image holding member which confronts next time is different from the original surface thereof.

That is to say, in the rotation in the opposite direction as in the present invention, on the assumption that the reciprocating movement of the toner takes place at the image portion, the developed visible image by toner is not to be obtained in principle. Accordingly, the effect of the A.C. voltage to be applied to the electrode roller in the present invention is not of the "reciprocating movement of toner" as disclosed in Japanese Patent Publication Tokkosho No. 63-42256 referred to earlier, but is assumed to be close to the "activation of toner movement" as shown in U.S. Pat. No. 3,866,574 also quoted earlier. Here, there may be achieved a new feature that, according to the present invention, since the toner is collected on the bare or uncovered surface of the electrode roller, the sleeve ghost phenomena brought into question in Tokkosho No. 63-42256 does not take place.

Moreover, according to the arrangement of the present invention, the developing material amount restricting blade which is normally employed for the developing roller is dispensed with, by the construction in which toner layer is not supported by the electrode roller. By causing the latent image holding member and the electrode roller to rotate in the opposite directions, the developing material is not clogged in the developing nip portion, and is smoothly passed over from the latent image holding member to the electrode roller. By the absence of the developing material amount restricting blade, cost reduction of the apparatus on the whole may be achieved, while, owing to the arrangement that the transportation of the developing material can be simultaneously effected with the rotating movement of the latent image holding member, construction of the developing unit may be simplified for compact size of the entire apparatus.

Referring also to FIG. 2 which shows a developing section of an electrophotographic apparatus in FIG. 8 (to be described later) on a large scale, the function of the electrophotographic apparatus according to the present invention will be explained more in detail.

In FIG. 2, the developing section includes a rotatable electrstatic latent image holding member P formed with an electrostatic latent image (not shown) on its surface and having a fixed magnet member M enclosed or incorporated within said holding member P, and an electrode roller R also rotatably provided through a predetermined gap with respect to the surface of said holding member P, with a magnetic developing material T contained in a developing material hopper (not shown here) for forming brush bristles Tb between the electrostatic latent image holding member P and the electrode roller R by the action of said magnet member M. The latent image holding member P formed with the electrostatic latent image carries the developing material T in a direction indicated by an arrow V1, and simultaneously formes the brush bristles of the developing material by magnetically attracting the magnetic developing material T through the magnet member M. The brush bristles Tb of the developing material T not only form a stable developing material layer between the electrostatic latent image holding member P and the electrode roller R, but act to prevent the developing material from spilling downward through the gap between the holding member P and the electrode roller R. The developing material electrostatically attracted onto the electrode roller R is transported in a direction indicated by an arrow V2 through rotation of said electrode roller R.

As described above, according to the arrangement of the present invention, since the respective constitutional elements can commonly serve for several functions which have been conventionally divided, the developing unit may be simplified in the construction.

Figure 3:
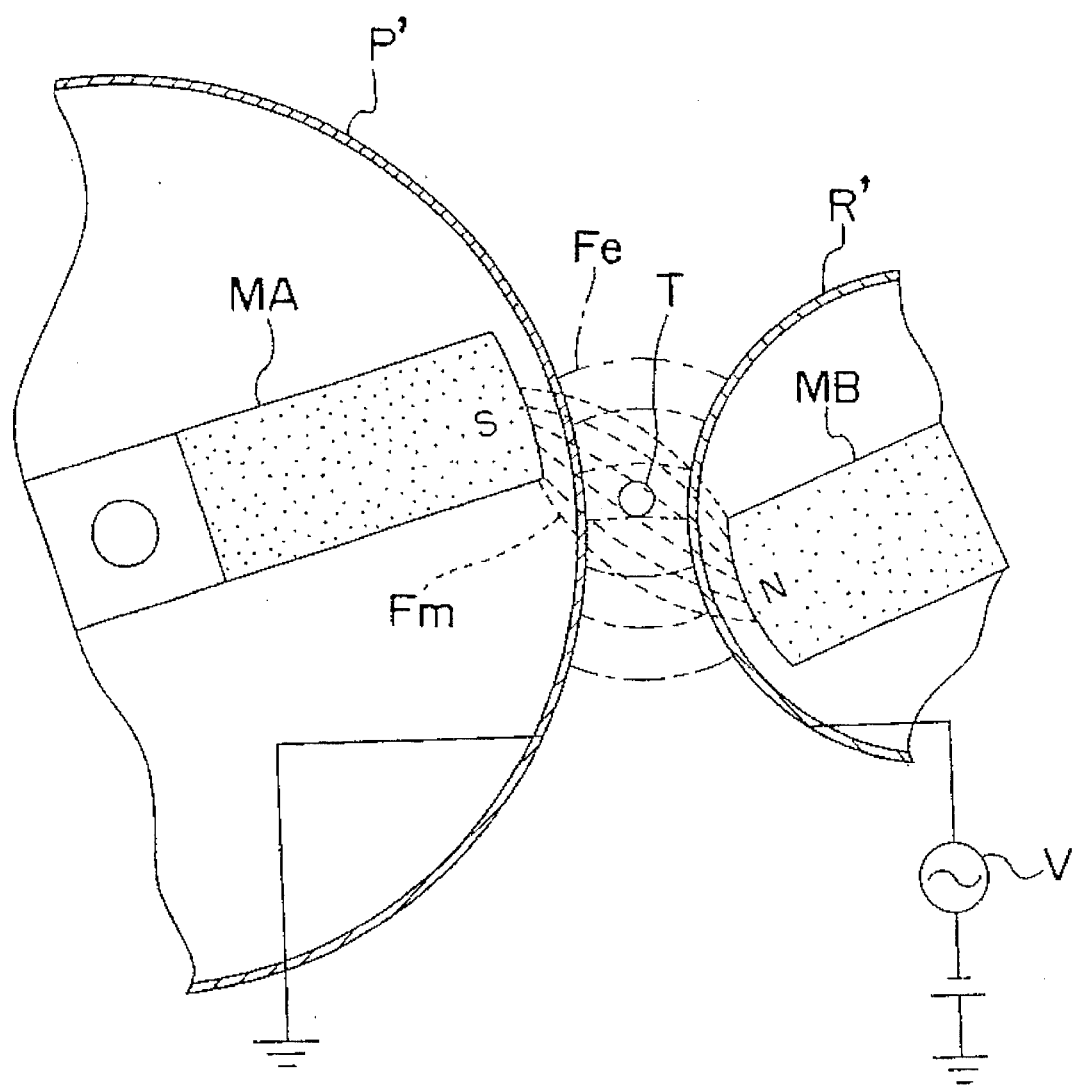

Referring also to FIG. 3, the reason why a high quality image can be obtained by a further improved arrangement of the present invention will be explained hereinbelow.

In FIG. 3, the developing section also includes the electrostatic latent image holding member P' formed with an electrostatic latent image (not shown) on its surface and having a fixed magnet member MA enclosed within said holding member P', and an electrode roller R' provided through a gap with respect to the surface of said latent image holding member P', and enclosed therein with another magnet member MB having a polarity opposite to that of the magnet member MA, with an A.C. power source V being connected to the electrode roller R' for impressing a high A.C. voltage to said roller R'. The charged toner to be moved in the developing region is represented by T, while electric lines of force to be produced between the latent image holding member P' and the electrode roller R' are represented by Fe, and magnetic lines of force to be generated between the magnet members MA and MB are denoted by Fm.

The force acting on the toner during the development according to the present invention will be explained hereinafter with reference to FIG. 3.

Normally, upon application of an A.C. voltage, with charged toner being disposed into between two electrodes, particles of the charged toner are subjected to reciprocating movement between the electrodes following variation of the alternating electric field. Here, according to the present invention, the electric field produced by the bias voltage and the magnetic field generated by the magnetic poles intersect each other within the developing gap. Therefore, when the charged toner particles T move along the electric lines of force Fe, they are to cross the magnetic lines of force Fm within the developing region, and thus, based on the so-called "Fleming's left-hand rule", the charged toner particles T not only move between the latent image holding member P' and the electrode roller R', but start to vibrate in the forward and backward directions of the paper surface in the drawing. By the rapid movement of toner within the developing region as described above, the electrostatic latent image on the latent image holding member P' is developed extremely faithfully to provide a high image quality.

Furthermore, according to the present invention, since the moving speed of the electrode roller is adapted to be slower than that of the latent image holding member after setting the moving direction of the electrode roller to be opposite to the advancing direction of the latent image holding member, the uncovered or bare electrode roller can remove the toner on said latent image holding member precisely. As a result, it becomes possible (1) to prevent irregularity in the developing direction, (2) to obtain a high resolution with respect to lateral lines, and also, (3) to achieve a sufficient image density.

Additionally, it will be readily understood that, according to the present invention, since time period for the developing material to contact the electrostatic latent image on the surface of the electrostatic latent image holding member is longer than that in the conventional magnetic brush developing method, the developing efficiency is extremely high for improved adaptability for high speeds.

Figure 4:
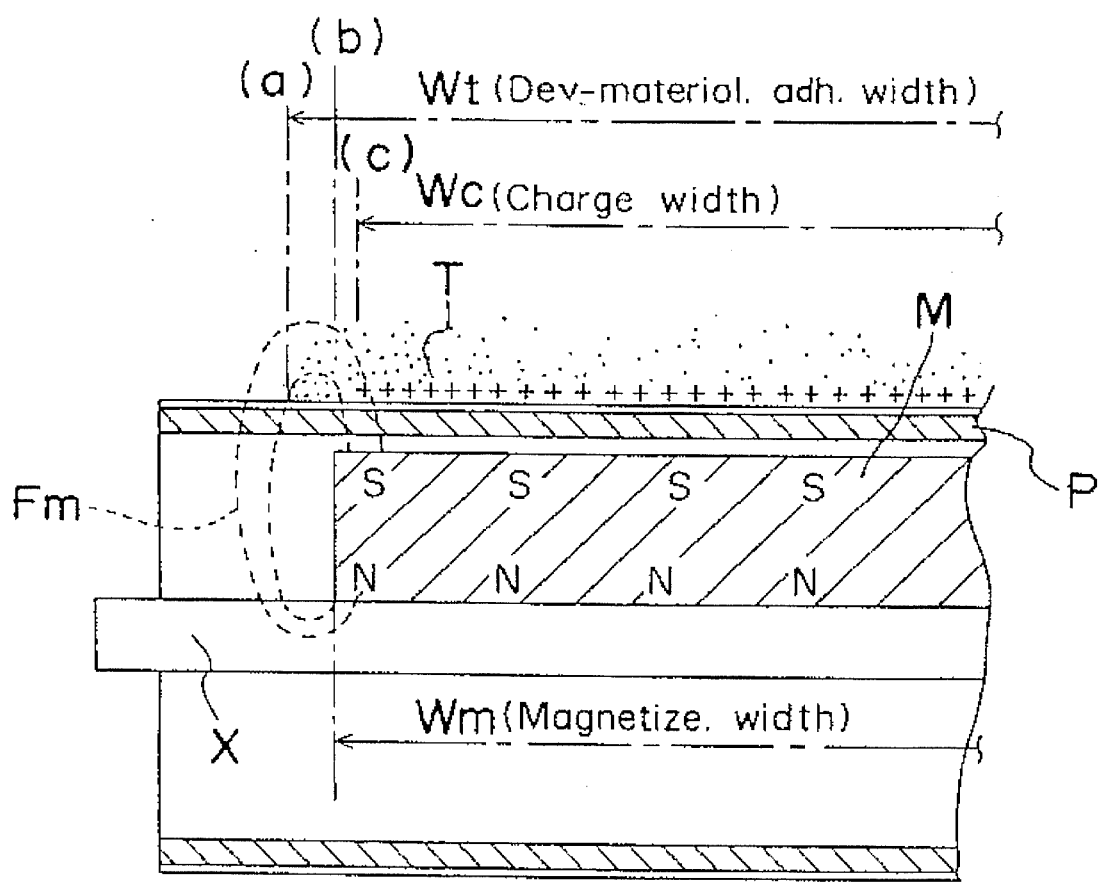
FIG. 4 is a fragmentary front sectional view of an electrostatic latent image holding member for explaining another function of the electrohotographic method of the present invention.

Incidentally, in the electrophotographic apparatus of the above described type, since it is so arranged to sprinkle a large amount of toner onto the electrostatic latent image holding member, there have often been cases where the opposite end portions of said latent image holding member are soiled by toner. This point will be described more in detail hereinbelow with reference to FIG. 4 showing a fragmentary cross section of the electrostatic latent image holding member or photoreceptor drum P of an aluminum material applied with an organic photosensitive material on its outer peripheral surface and rotatably supported by an axis X, and the magnet member M provided within the photoreceptor drum P. In FIG. 4, the magnetic lines of force emitted from the edge portion of the magnet member M are represented by Fm, the magnetic developing material attached onto the surface of the photoreceptor drum P is shown By T, an adhering width of the magnetic developing material T is denoted by Wt ((a)—(a)), a charged width of the photoreceptor drum P charged by a corona charger (not shown) is represented by Wc, ((c)—(c)), and a magnetizing width of the magnet member M is shown by Wm ((b)—(b)). In the apparatus in which the toner soiling took place, the charged width Wc of the photoreceptor drum P and the magnetizing width Wm of the magnet member M provided within the photoreceptor drum P are of the same length. In the above case, the magnetic lines of force Fm emitted from the edge portion of the magnet member M within the photoreceptor drum P are directed around the outer side of the edge portion as shown, and therefore, the adhering width Wt of the developing material adhering onto the surface of the photoreceptor drum P along the magnetic lines of force become larger than the charged width Wc, and thus, it has been found that the toner at that portion adheres to the uncharged portion of the photoreceptor drum P. According to the present invention, by arranging the width of the magnet member M within the latent image holding member i.e. the photoreceptor drum P, smaller than the width of the charging portion of said holding member, unnecessary toner adhesion onto the opposite end portions of the latent image holding member is prevented, together with the prevention of the soiling by toner within the apparatus.

Moreover, according to the present invention, it is possible to magnetically attract the developing material T by the magnet member M provided within the latent image holding member P for supplying thereof onto said member by a large amount. In other words, since the developing width is large, a superior developing apparatus simple in the overall construction and capable of coping with the high speed processing can be advantageously presented.

In the case where the present invention is applied to the reversal development, immediately after starting operation of the developing apparatus, the surface of the latent image holding member within the developing material hopper contacts the developing material in the state where said surface is not charged. If a bias voltage is applied to the electrode roller in the above state, a large amount of toner adheres onto the surface of the latent image holding member, thus resulting in a wasteful use of toner. Therefore, by arranging the impression of the bias voltage to the electrode roller, to be started in timing, at least after the charged portion of the latent image holding member begins to pass before the electrode roller, such adhesion of toner may be prevented.

As the charging device for the present invention, the corona charger common by used or a scorotron charger having a grid may be employed. Moreover, any charging devices used for ordinary electrophotographic apparatuses such as a roller charger constituted by an elastic rubber material and the like, and electroconductive fur brush charger, etc. can also be applied for the purpose. The charging width thereof may only be larger than the maximum paper sheet width to be printed, e.g. about 220 mm in the case of an A4 paper sheet, the allowance thereof being sufficient for the purpose if it is larger than a recording width by more than 3 mm at one side.

According to the present invention, the latent image holding member enclosing the magnet member therein is employed, and this magnet member is not rotated, with only the latent image holding member being rotated. In the above case, if the magnet member and the latent image holding member are arranged to be supported on the same shaft, there is such an advantage that the mechanism for driving the latent image holding member is simplified, while the adjustment of the magnetic pole position can be readily effected. The magnet member provided within the latent image holding member according to the present invention is required to have the maximum flux density higher than 300 gauss on the surface of the latent image holding member, which should preferably be 500 to 1200 gauss. If the maximum flux density falls below 300 gauss, the effect of the magnetic force will be reduced, resulting in such defects as non-uniformity in the image quality or tendency to clogging of toner between the electrode roller and the latent image holding member. The magnetizing width of the magnet member within the latent image holding member to be used for the present invention may be equal to or slightly larger than the maximum printing width of the paper sheet to be printed, and for example, may be about 210 mm if the printing width is 200 mm in an A4 paper sheet (width 210 mm). In this case, the magnetizing width should be narrower than the charging width referred to earlier, and the range thereof to be smaller than said charging width referred to earlier may be about more than 3 mm at one side to sufficiently meet the practical purpose.

For the latent image holding member of the present invention, there may be used zinc oxide, selenium, cadmium sulfide, amorphus silicon, and further, organic photosensitive members employing phthalocyanine, and azoic dyes, etc. Needless to say, ordinary electrostatic recording paper or the like may be used. It is to be noted here that the surface of the latent image holding member may be roughened by sand blasting, etc. for expediting formation of the developing material layer.

In the present invention, a developing material hopper having an opening portion with respect to the surface of the latent image holding member is employed. It is so arranged that the developing material is directly brought into contact with the latent image holding member from the developing material hopper, and is magnetically attracted onto the latent image holding member regardless of the fact whether the developing material is charged or not. The developing material hopper as referred to above should have a width, at its opening portion confronting the latent image holding member, larger than 5 mm in a moving direction of said latent image holding member. More preferably, such width should be in the range of 10 to 15 mm, and if reduced below 5 mm, image density was markedly lowered.

The magnetic developing material to be employed in the present invention should preferably be of an insulative mono-component toner, which makes it possible to simplify the construction of the apparatus. The mono-component toner to be used for the present invention is prepared by dispersing powder of magnetite, ferrite or the like in a binder resin such as styrene resin, acrylic resin or the like, together with a charge control agent for subsequent classification after grinding. The toner may be in the form of powder obtained by the spray drying or that chemically obtained by the suspension polymerization, etc. The average particle diameter of the toner to be employed should preferably be less than 15 μm, but a still sharper image may be obtained if the average particle diameter is reduced to less than 12 μm.

The developing method of the present invention is arranged to once cause the toner to adhere onto the entire surface of the latent image holding member, and thereafter, to remove the toner at the non-image portion by the electrode roller. In the above practice, however, it has been found that, if the toner is inferior in its fluidity, such toner at the non-image portion too strongly adheres to the latent image holding member to be removed therefrom, thus resulting in the ground fogging for deterioration of the image quality. When fine particles of silica were added onto the surfaces of particles of the toner, there was such an effect that the fluidity of the toner was improved, with non-electrostatic adhering force thereof onto the latent image holding member being simultaneously reduced, and the undesirable ground fogging was eliminated. It was also found that in the above case, the silica particles contribute not only to the improvement of the fluidity, but also to the charging of the toner.

It was further found that in the above developing method, a charging member for charging the toner is not particularly required to be provided in the case of the mono-component toner, and if the silica particles are added to the toner, they act to charge the toner to the same polarity as the latent image holding member by transferring the charge from the side of the latent image holding member to the side of the toner, upon contact of the toner with the charged latent image holding member. Such silica fine particles as referred to above are also referred to as colloidal silica.

In the present invention, a two or dual-component developing material composed of toner and magnetic carrier can also be employed. The toner to be used for the present invention is prepared by dispersing coloring pigments such as carbon black, phthalocyanine and the like in a binder resin such as acrylic resin, polyester resin, etc. for subsequent classification after grinding. The toner may be in the form of powder obtained by the spray drying or that chemically obtained by the suspension polymerization, emulsion polymerization, etc. Moreover, the toner particles may be mixed into the carrier as they are, or may be further adhered on their surfaces with silica fine particles or fluoro-resin fine particles. The average particle diameter of the toner to be employed should preferably be less than 15 μm, but a still sharper image may be obtained if the average particle diameter is reduced to less than 12 μm.

For the carrier to be employed in the present invention, there may be employed a magnetic powder prepared by dispersing and mixing a magnetic material such as iron powder, ferrite powder and the like, a powder produced by resin-coating on the surface thereof, or fine particles of ferrite, magnetite, etc., into styrene resin, epoxy resin, styrene acrylic resin, etc. at the rate of about 30 to 80% for subsequent classification after grinding. The average particle diameter of the carrier should preferably be less than 300 μm, and particularly, less than 150 μm for uniform charging of the toner.

The distance between the electrode roller and the latent image holding member should be about 100 μm to 700 μm in the case where the mono-component toner was employed, and about 400 μm to 2 mm when the dual-component developing material was adopted.

The material of the electrode roller may be electrically conductive. In the case where the fluidity of the developing material is poor, the electrode roller may be made of a magnetic material, in which case, the magnetic lines of force from the magnet member within the latent image holding member reach as far as the electrode roller, with a consequent improvement on the transporting characteristic of the developing material. For the material as described above, there may be available, for example, soft iron, magnetic stainless steel, or nickel, etc. The surface of the electrode roller may be polished, or formed with undulation by sand blast processing or provided with grooves.

The electrode roller may be of a non-magnetic roller construction having a magnet member fixedly provided therein. For example, there is a construction having magnet member inserted in a cylinder made of a non-magnetic stainless steel or aluminum material, etc. The polarity of the magnet member provided within the electrode roller should preferably be of the opposite polarity to that of the magnet member within the latent image holding member. Moreover, in order to improve the transportability of the developing material, and moving characteristic of the toner during the development, it is desirable to set the magnetic pole position of the magnet member within the latent image holding member at the closest position between the latent image holding member and the electrode roller or in a position at the upstream side therefrom. An angle θ for the purpose should preferably be in the range of 0° to 30°.

The electrode roller referred to above is to be impressed with an A.C. voltage, which may be of a pulse waveform or triangular wave so long as an alternating electric field is effectively applied between said electrode roller and said latent image holding member. The frequency of this A.C. voltage is varied by the processing speed for the image formation, and is in the range of about 50 Hz to 5000 Hz, and more preferably, 300 Hz to 3000 Hz. The value of the A.C. voltage should be approximately 0.5 to 3 times that of the charge potential of the latent image holding member, and more preferably, be 0.5 to 2 times thereof, in the zero to peak value. Meanwhile, when the value of the D.C. voltage to be superposed on the A.C. voltage is set to be equal to or lower than the charge potential of the latent image holding member by several tens % in the case of the reversal development, a favorable negative-positive reversal image may be obtained. Conversely, in the case of the regular development, if the value thereof is set to be equal to or higher than a background potential of the latent image holding member by several tens %, a favorable positive image may be obtained.

In the case of the reversal development, if the A.C. voltage is applied to the electrode roller simultaneously with the starting of the rotational movement of the latent image holding member, since the surface of the latent image holding member located within the developing material hopper is not charged, a large amount of toner adheres thereto in the form of a solid image. Therefore, it should be so arranged that the voltage impression to the electrode roller is effected when the region at which the surface of the latent image holding member charged by the corona charger passes before the electrode roller. For an improved method of the above practice, it may be so arranged that the voltage to be applied to the electrode roller is adapted to be an A.C. voltage superposed with a D.C. voltage, and during passing of the uncharged region (with the surface potential of nearly 0 V) of the surface of said latent image holding member, the A.C. voltage superposed with the D.C. voltage as will prevent the toner from remaining on the latent image holding member is applied, while during passing of the charged region thereof, the A.C., voltage superposed with the D.C. voltage as will subject the toner to the developing is impressed.

If the rotational direction of said electrode roller is set to be in the opposite direction to the advancing direction of the latent image holding member, a high quality image may be obtained, with simultaneous simplification of the construction for the apparatus.

For efficiently removing the fogging on the latent image holding member, it is desirable to increase the moving speed of the electrode roller. On the contrary, as the moving speed of the electrode roller is reduced, the toner on the surface of the latent image holding member may be removed more carefully. The speed of the electrode roller should preferably be in the range of 0.3 to 2 times the moving speed of the latent image holding member.

The toner adhering to the electrode roller is scraped off by a scraper provided within the developing material hopper, and again returned into the developing material hopper. In order to avoid influence over the electrode roller, it is desirable that the scraper is electrically insulated. Therefore, as a material for said scraper, a plastic material such as a polyester film is preferable. Although a stainless steel or phosphor bronze plate, etc. may also be used for the scraper, it is necessary in this case to arrange that the scraper does not electrically contact a part other than a toner collecting roller to avoid any electrical influence to the electrode roller.

Referring now to the drawings, embodiments of the electrophotographic apparatus according to the present invention will be explained hereinafter.

(Embodiment 1)

Figure 5:
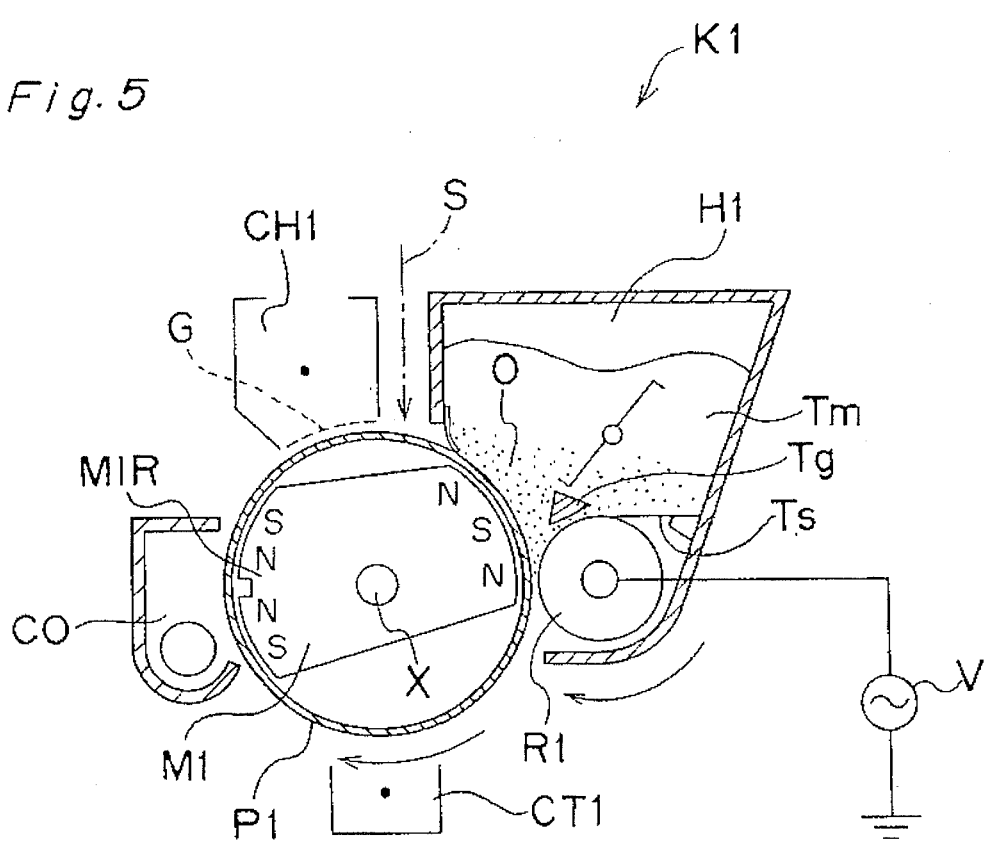
FIG. 5 is a schematic side sectional view of an electrophotographic apparatus according to a first embodiment of the present invention.

Referring to FIG. 5, there is shown an electrophotographic apparatus K1 according to one preferred embodiment of the present invention, which generally includes an organic photoreceptor drum P1 formed by dispersing phthalocyanine into a polyester binder resin and rotatably supported by an axis X, a magnet member M1 having seven magnetic poles and fixed on the same shaft X for the photoreceptor drum P1, a corona charger CH1 provided to negatively charge the surface of the photoreceptor drum P1 and having a grid electrode G for controlling the charge potential of said photoreceptor drum, a developing material hopper H1 having an opening portion O adjacent to the surface of the photoreceptor drum P1 and accommodating therein a negatively charging magnetic mono-component toner Tm having an average particle diameter of 10 μm and guided by a toner guide Tg, with said magnet member M1 being formed, at its portion confronting said hopper H1, with three magnetic poles attracting to each other, and at its repelling magnetic field portion M1R at the other side with respect to the axis X, with four magnetic poles repelling to each other, an electrode roller R1 of magnetic stainless steel provided at a lower portion of the hopper H1 in a position confronting the surface of the photoreceptor drum P1, and applied with a high voltage by an A.C. high voltage source V, a scraper Ts made of a polyester film provided to scrape off the toner on the surface of the electrode roller R1, a transfer corona charger CT1 for transferring a toner image formed on the surface of the photoreceptor drum P1 onto a paper sheet (not shown), and a collecting portion CO for collecting toner scattered by the repelling magnetic field portion MIR, with a signal light beam S being arranged to be directed onto the surface of the photoreceptor drum P1 as shown.

In the above arrangement, the photoreceptor drum P1 with a diameter of 30 mm had a flux density of 800 Gs on its surface, and is rotated at a circumferential speed of 30 mm/s.

The magnetic mono-component toner employed in the above case is prepared by mixing 70% of polyester resin, 25% of ferrite, 3% of carbon black, and 2% of oxycarbonic acid metallic complex, with external addition of 0.4% of colloidal silica (all in weight %).

Still referring to FIG. 5, the functioning of the electrophotographic apparatus having the construction as described above will be explained hereinafter.

Figure 6:
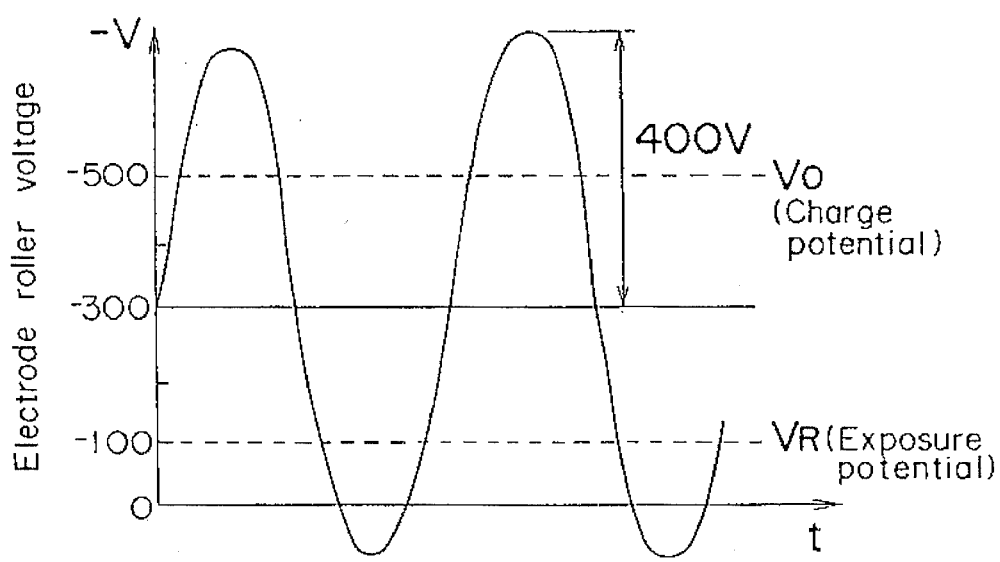
FIG. 6 is a graphical diagram showing waveforms of A.C. voltages to be employed in the first and a ninth embodiments of the present invention.

In the first place, the surface of the photoreceptor drum P1 was charged to −500 V by the corona charger CH1 (impressed voltage −4 kV, voltage of the grid electrode G-500 V). The laser beam S was projected onto the surface of said photoreceptor drum P1 to form an electrostatic latent image thereon, with the exposure potential of the photoreceptor surface at that time being −100 V. Onto the surface of said photoreceptor drum P1, the magnetic mono-component toner Tm was caused to adhere within the developing material hopper H1 by the magnetic force. At this time, the toner was charged to approximately −3μ C/g. Subsequently, the surface of the photoreceptor drum P1 to which the toner had adhered was caused to pass before the electrode roller R1, which was disposed through a distance of 300 μm with respect to the surface of the photoreceptor drum P1. To the electrode roller R1, an A.C. voltage (frequency 300 Hz) of 400 V 0-p (peak to peak voltage 800 V) superposed with a D.C. voltage of −300 V and having a waveform as shown in FIG. 6 was applied through a high voltage source V. The toner in a layer on the surface of the photoreceptor drum P1 moves between the drum P1 and the electrode roller R1, and the toner at the non-image portion is gradually shifted onto the side of the electrode roller R1, and thus, a negative-positive reversed toner image was left only at the image portion on the surface of the photoreceptor drum P1. The toner adhering onto the surface of the electrode roller R1 rotating in a direction indicated by an arrow was scraped off therefrom by the scraper Ts so as to be returned into the hopper H1 again for use in the subsequent image formation. Then, after transferring the toner image thus obtained on the surface of the photoreceptor drum P1 onto a paper sheet (not shown) by the action of the transfer charger CT1, said toner image was thermally fixed on the paper sheet by a fixing device (not shown). On the other hand, the toner remaining on the surface of the photoreceptor drum P1 after the transfer is scattered therefrom by the action of the repelling magnetic field portion M1R of the magnet member M1 as the photo receptor drum P1 is moved, and collected into the collecting portion CO. Although some of the toner scattered by the repelling magnetic field portion M1R may be returned onto the surface of the photoreceptor drum P1, since the portion of the toner which as passed through the repelling magnetic field at this time adheres to the surface of the photoreceptor drum P1 in a dispersed state, there is almost no substantial influence on the subsequent charging and exposure.

Thereafter, the surface of the photoreceptor drum P1 was again charged by the corona charger CH1 for use in the subsequent image forming process, as a result of which a sharp image free from scattering of toner could be obtained.

It is to be noted here that in the above embodiment, although the collecting portion CO for collecting the toner scattered by the repelling magnetic field portion M1R is provided, since the toner once repelled and again adhering to the surface of the photoreceptor drum P1 is sufficiently dispersed, it does not affect the subsequent process if its amount is small. Therefore, if the magnetic field is so arranged that the dispersed toner again adheres onto the surface of the photoreceptor drum, the collecting portion CO may be dispensed with.

(Embodiment 2)

Figure 7:
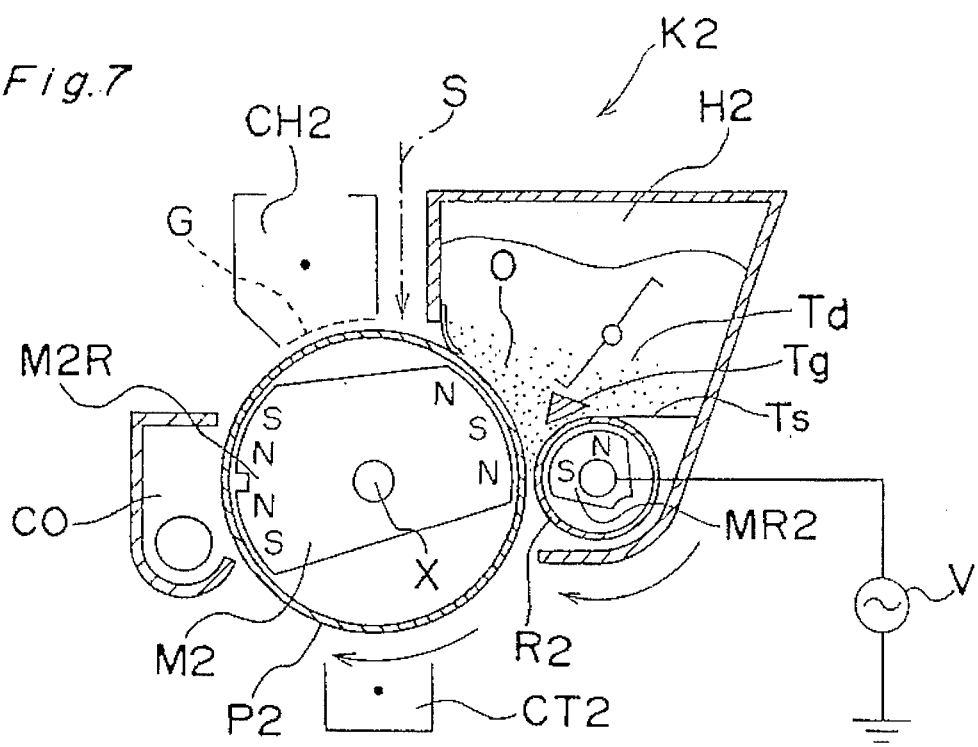
FIG. 7 is a view similar to FIG. 5, which particularly shows a second embodiment of the present invention.

The electrophotographic apparatus K2 for a second embodiment of the present invention as shown in FIG. 7 is different in construction from the apparatus K1 of FIG. 5 in that a fixed magnet member MR2 is further enclosed in an electrode roller R2, with a dual,component developing material Td prepared by mixing toner and carrier being employed instead of the mono-component toner Tm used in the first embodiment of FIG. 5, while other constructions are generally similar to those of the apparatus K1 of FIG. 5, with like parts being designated by like reference numerals. The toner employed was prepared by mixing 5% of carbon black and 2% of oxycarbonic acid metallic complex with 93% of styrene acrylic resin, with further external addition of 0.1% of colloidal silica thereto (all in weight %). Within the developing material hopper H2, the dual-component developing material Td prepare by mixing the toner with carrier of ferrite powder having an average particle diameter of 100 µm and coated by silicon resin on its surface, was accommodated so as to be caused to adhere onto the surface of the photoreceptor drum P2 by the magnetic force. When the photoreceptor drum P2 formed with an electrostatic latent image on its surface was passed through the developing material Td, said developing material was attracted onto the surface of the photoreceptor drum, and when said surface is passed the electrode roller R2, only the toner at the image portion remained on the surface of the photoreceptor drum P2 even after passing said electrode roller R2, and thus, the toner image was obtained on said surface. After transferring the toner image thus obtained onto a paper sheet (not shown) by the transfer charger CT2, the transferred toner image was thermally fixed onto the paper sheet by a fixing device (not shown). On the other hand, after the transfer, the surface of the photoreceptor drum P2 was again charged by the corona charger CH2 for use in the subsequent image forming process. As a result, a sharp image free from scattering of toner could be obtained.

(Embodiment 3)

Figure 8:
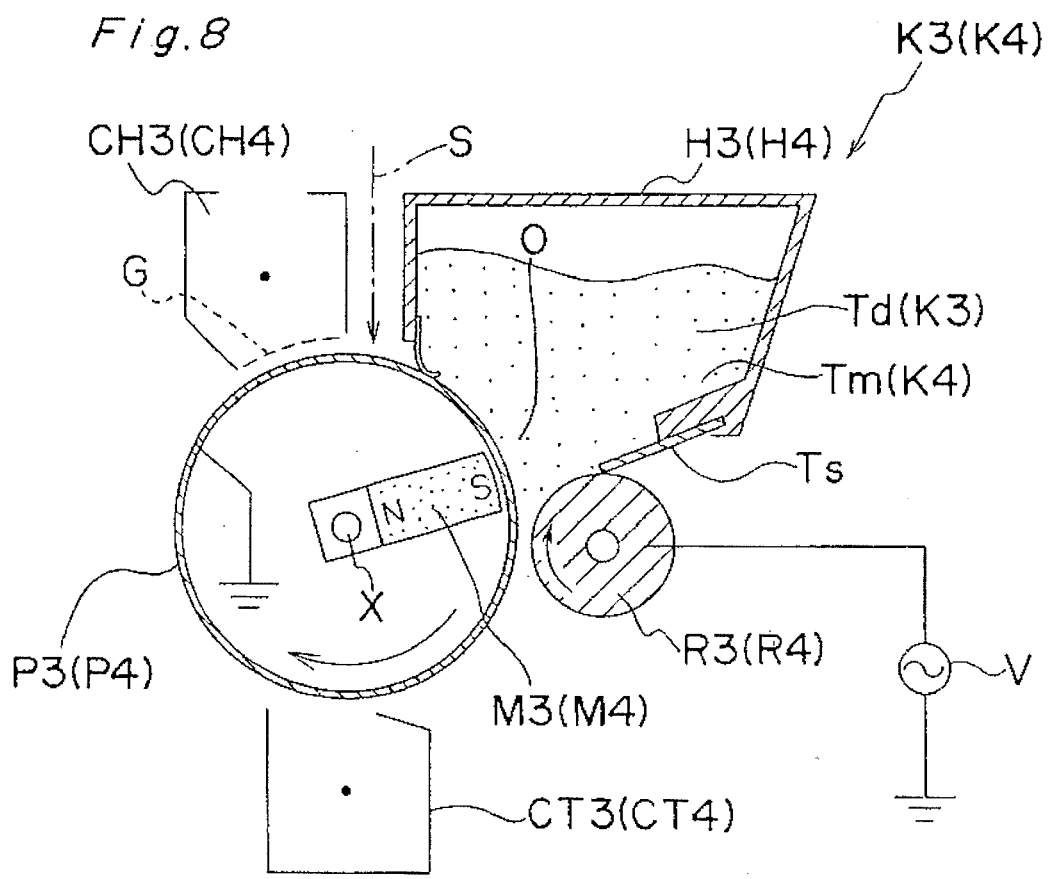
FIG. 8 is a view similar to FIG. 5, which particularly shows third and fourth embodiments of the present invention.

Referring further to FIG. 8, there is shown an electrophotographic apparatus K3 for a third embodiment of the present invention, which similarly includes an organic photoreceptor drum P3 formed by dispersing phthalocyanine into a polyester binder resin and rotatably supported by an axis X, a magnet member M3 having magnetic poles and fixed on the same shaft X for the photoreceptor drum P3, a corona charger CH3 provided to negatively charge the surface of the photoreceptor drum P3 and having a grid electrode G for controlling the charge potential of said photoreceptor drum, a developing material hopper H3 having an opening portion O adjacent to the surface of the photoreceptor drum P3 and accommodating therein a magnetic dual-component developing material Td including toner and carrier, an electrode roller R3 of magnetic stainless steel provided at a lower portion of the hopper H3 in a position confronting the surface of the photoreceptor drum P3 through a gap of 500 µm, and applied with a high voltage by an A.C. high voltage source V, a scraper Ts made of a polyester film provided to scrape off the toner on the surface of the electrode roller R3, and a transfer corona charger CT3 for transferring a toner image formed on the surface of the photoreceptor drum P3 onto a paper sheet (not shown), with signal light beam S being directed onto the surface of the photoreceptor drum P3 as shown.

In the above arrangement, the photoreceptor drum P3 with a diameter of 30 mm had a flux density of 800 Gs on its surface, and was rotated at a circumferential speed of 60 mm/s.

The toner employed was prepared by mixing 5% of carbon black and 2% of oxycarbonic acid metallic complex with 93% of styrene acrylic resin, with further external addition of 0.5% of colloidal silica thereto (all in weight %). For the carrier, ferrite powder having an average particle diameter of 100 µm and coated by silicone resin on its surface was employed the magnetic pole of the magnet member M3 was set an angle of 30° from the closest position with respect to the electrode roller R3 toward the upstream side.

Still referring to FIG. 8, the functioning of the electrophotographic apparatus K3 having the construction as described above will be explained hereinafter.

Firstly, the surface of the photoreceptor drum P3 was charged to −500V by the corona charger CH1 (impressed voltage −4 kV, voltage of the grid electrode G-500 V). The laser beam S was projected onto the surface of said photoreceptor drum P3 to form an electrostatic latent image thereon, with the exposure potential of the photoreceptor surface at that time being −100 V. Onto the surface of said photoreceptor drum P3, the magnetic dual-component developing material Td was caused to adhere within the developing material hopper H3 by the magnetic force. Subsequently, the surface of the photoreceptor drum P3 to which the toner had adhered was caused to pass before the electrode roller R3, which was disposed through a distance of 500 µm with respect to the surface of the photoreceptor drum P3. During passing of the uncharged region of the photoreceptor drum, an A.C. voltage (frequency 500 Hz) of 500 V 0-p (peak to peak voltage 1 kV) not superposed with a D.C. voltage was applied to the electrode roller R3 through a high voltage source V. Thereafter, during passing of the surface of the photoreceptor drum charged to −500 V and written with the latent image, an A.C. voltage (frequency 500 Hz) of 500 V 0-p (peak to peak voltage 1 kV) superposed with a D.C. voltage of −350 V was applied to the electrode roller R3 through the high voltage source V. Then, the developing material Td is subjected to movement between the drum P3 and the electrode roller R3, and thus, a negative-positive reversed toner image was left only at the image portion on the surface of the photoreceptor drum P3. The toner adhering onto the surface of the electrode roller R3 rotating in a direction indicated by an arrow was scraped off therefrom by the scraper Ts so as to be returned into the hopper H3 again for use in the subsequent image formation. then, after transferring the toner image thus obtained on the surface of the photoreceptor drum P3 onto a paper sheet (not shown) by the action of the transfer charger CT3, said toner image was thermally fixed on the paper sheet by a fixing device (not shown).

As a result, a sharp and definite image free from a trace of magnetic brush bristles or scattering of toner could be obtained.

(Embodiment 4)

Still referring to FIG. 8, an electrophotographic apparatus K4 according to a fourth embodiment of the present invention will be explained hereinafter. In the fourth embodiment, a magnetic insulative mono-component toner Tm composed of 70% of polyester resin, 25% of ferrite, 3% of carbon black, and 2% of oxycarbonic acid metallic complex, with further external addition of 0.4% of colloidal silica was employed (all in weight %). Since the brush bristles adhering to the magnet member become small when the mono-component toner was employed, the gap between the photoreceptor drum P4 and the electrode roller R4 was set at 300 µm, while the magnetic pole of the magnet member M4 was set at an angle of 20° from the closest position of the electrode roller R4 toward the upstream side.

By the above arrangement for the fourth embodiment in FIG. 8, the surface of the photoreceptor drum P4 was charged to −500 V by the corona charger CH4 (impressed voltage −4 kV, voltage of the grid electrode G-500 V). The laser beam S was projected onto the surface of said photoreceptor drum P4 to form an electrostatic latent image thereon, with the exposure potential of the photoreceptor surface at that time being −100 V. Onto the surface of said photoreceptor drum P4, the magnetic mono-component toner Tm was caused to adhere within the developing material hopper H4 by the magnetic force. Subsequently, the surface of the photoreceptor drum P4 to which the toner had adhered was caused to pass before the electrode roller R4, which was disposed through a distance of 500 μm with respect to the surface of the photoreceptor drum P4. During passing of the uncharged region of the photoreceptor drum, an A.C. voltage (frequency 500 Hz) of 500 V 0-p peak to peak voltage 1 kV) not superposed with a D.C. voltage was applied to the electrode roller R4 through a high voltage source V. Thereafter, during passing of the surface of the photoreceptor drum charged to −500 V and written with the latent image, an A.C. voltage (frequency 500 Hz) of 500 V 0-p (peak to peak voltage 1 kV) superposed with a D.C. voltage of −350 V was applied to the electrode roller R4 through the high voltage source V. Then, the toner was subjected to movement between the drum P4 and the electrode roller R4, thus, a negative-positive reversed toner image was left only at the image portion on the surface of the photoreceptor drum P4. The toner adhering onto the surface of the electrode roller R4 rotating in a direction indicated by the arrow was scraped off therefrom by scraper Ts so as to be returned into the hopper H4 again for use in the subsequent image formation. Then, after transferring the toner image thus obtained on the surface of the photoreceptor drum P4 onto a paper sheet (not shown) by the action of the transfer charger T4, said toner image was thermally fixed on the paper sheet by a fixing device (not shown).

As a result, a sharp and definite image free from a trace of magnetic brush bristles or scattering of toner could also be obtained.

(Embodiment 5)

Figure 9:
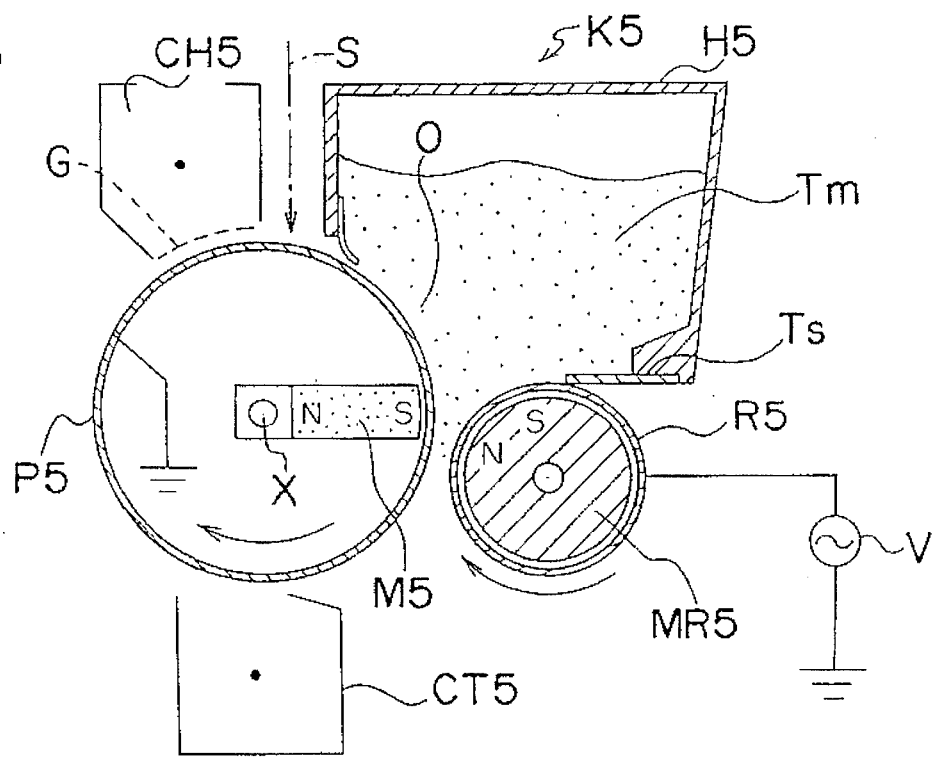
FIG. 9 is a view similar to FIG. 5, which particularly shows a fifth embodiment of the present invention.

The electrophotographic apparatus K5 according to a fifth embodiment of the present invention as shown in FIG. 9 also, includes an organic photoreceptor drum P5 formed by dispersing phthalocyanine into a polyester binder resin and rotatably supported by its axis X. a magnet member M5 having magnetic poles and fixed on the same shaft X for the photoreceptor drum P5, a corona charger CH5 provided to negatively charge the surface of the photoreceptor drum P5 and having a grid electrode G for controlling the charge potential of said photoreceptor drum, a developing material hopper H5 having an opening portion O adjacent to the surface of the photoreceptor drum P5 and accommodating therein a magnetic mono-component toner Tm, a non-magnetic roller R5 provided at a lower portion of the hopper H5 in a position confronting the surface of the photoreceptor drum P5 through a predetermined gap, and applied with a high voltage by an A.C. high voltage source V, a magnet member MR5 provided within the electrode roller R5, a scraper Ts made of a polyester film provided to scrape off the toner on the surface of the electrode roller R5, and a transfer corona charger CT5 for transferring a toner image formed on the surface of the photoreceptor drum P5 onto a paper sheet (not shown), with a signal light beam S being directed onto the surface of the photoreceptor drum P5 as shown.

In the above arrangement, the photoreceptor drum P5 with a diameter of 30 mm had a flux density of 800 Gs on its surface, and is rotated at a circumferential speed of 60 mm/s.

The magnetic mono-component developing material employed in the above case was the fine particle insulative magnetic mono-component toner with an average particle diameter of 5 μm, which was prepared by 70% of polyester resin, 25% of ferrite, 3% of carbon black, and 2% of oxycarbonic acid metallic complex, with external addition of 0.1% of colloidal silica (all in weight %). Since the brush bristles adhering to the magnet member become small when the fine particle mono-component toner was employed, with a marked deterioration of the transportability, the gap between the photoreceptor drum P5 and the electrode roller R5 was set at 200 μm, while the magnetic force within the electrode roller R5 is set to be stronger than that within the photoreceptor drum P5 for improvement of the transportability.

By the above arrangement for the fifth embodiment in FIG. 9, the surface of the photoreceptor drum P5 was charged to −500 V by the corona charger CH5 (impressed voltage −4 kV, voltage of the grid electrode G-500 V). The laser beam S was projected onto the surface of said photoreceptor drum P5 to form an electrostatic latent image thereon, with the exposure potential of the photoreceptor surface at that time being −100 V. Onto the surface of said photoreceptor drum P5, the magnetic mono-component toner Tm was caused to adhere within the developing material hopper H5 by the magnetic force. Subsequently, the surface of the photoreceptor drum P5 to which the toner had adhered was caused to pass before the electrode roller R5, which was disposed through a distance of 200 μm with respect to the surface of the photoreceptor drum P5. During passing of the uncharged region of the photoreceptor drum, an A.C. voltage (frequency 500 Hz) of 500 V 0-p (peak to peak voltage 1 kV) superposed with a D.C. voltage of +100 V was applied to the electrode roller R5 through a high voltage source V. Thereafter, during passing of the surface of the photoreceptor drum P5 charged to −500 V and written with the latent image, an A.C. voltage (frequency 500 Hz) of 500 V 0-p (peak to peak voltage 1 kV) superposed with a D.c. voltage of −350 V was applied to the electrode roller R5 through the high voltage source V. Then, the toner was subjected to movement between the drum P5 and the electrode roller R5, thus, a negative-positive reversed toner image was left only at the image portion on the surface of the photoreceptor drum P5.

The toner adhering onto the surface of the electrode roller R5 rotating in a direction indicated by the arrow was scraped off therefrom by the scraper Ts so as to be returned into the hopper H5 again for use in the subsequent image formation. Then, after transferring the toner image thus obtained on the surface of the photoreceptor drum P5 onto a paper sheet (not shown) by the action of the transfer charger CT5, said toner image was thermally fixed on the paper sheet by a fixing device (not shown). As a result, a favorable image with extremely high resolution free from a trace of magnetic brush bristles of the developing material or scattering of toner, and reproducing the image of 32 lines/mm, could be obtained.

(Embodiment 6)

Figure 10:
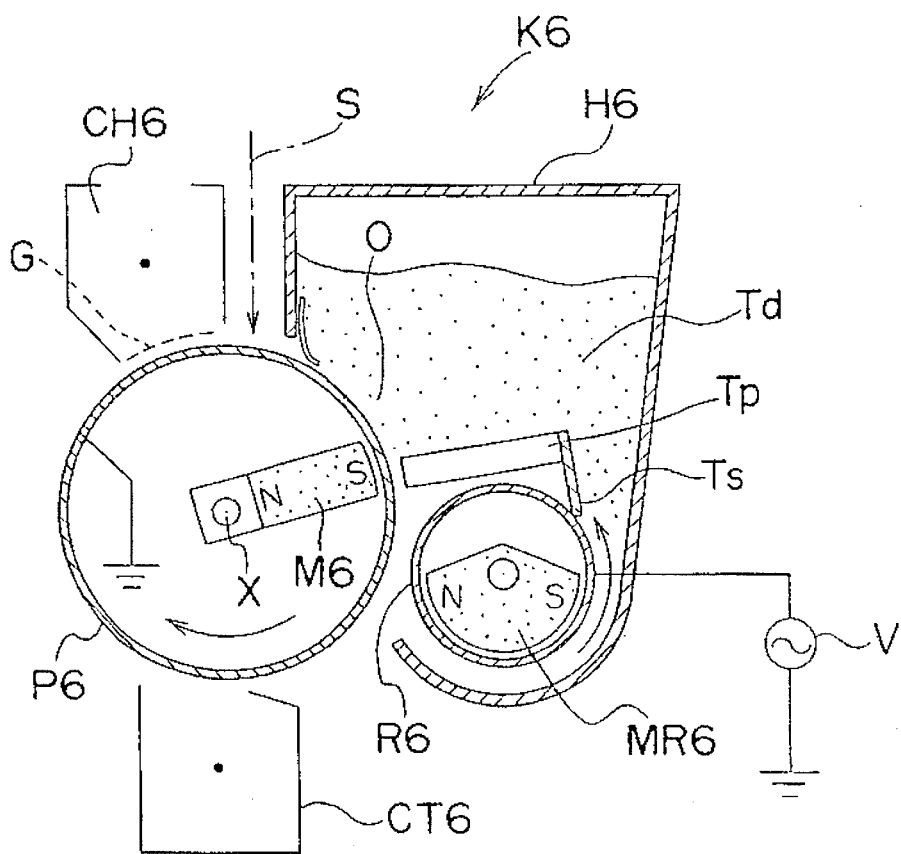
FIG. 10 is a view similar to FIG. 5, which particularly shows a sixth embodiment of the present invention.

Referring further to FIG. 10, there is shown an electrophotographic apparatus K6 for a sixth embodiment of the present invention, which similarly includes an organic photoreceptor drum P6 formed by dispersing phthalocyanine into a polyester binder resin and rotatably supported by an axis X, a magnet member M6 fixed on the same shaft X for the photoreceptor drum P6, a corona charger CH6 provided to negatively charge the surface of the photoreceptor drum P6 and having a grid electrode G for controlling the charge potential of said photoreceptor drum, a developing material hopper H6 having an opening portion O adjacent to the surface of the photoreceptor drum P6 and accommodating therein a magnetic dual-component developing material Td including toner and carrier, a developing material amount restricting plate Tp for restricting the amount of the developing material Td adhering to the surface of the photoreceptor drum P6, a non-magnetic electrode roller R6 provided at the lower portion of the hopper H6 in a position confronting the surface of the photoreceptor drum P6 through a predetermined gap, and applied with a high voltage by an A.C. high voltage source V, a magnet member MR6 provided within the electrode roller R6, a scraper Ts made of a polyester film provided to scrape off the toner on the surface of the electrode roller R6, and a transfer corona charger CT6 for transferring a toner image formed on the surface of the photoreceptor drum P6 onto a paper sheet (not shown). The signal light beam S is directed onto the surface of the photoreceptor drum P6 as shown.

In the above arrangement, the flux density on the surface of the photoreceptor drum P6 is 800 Gs, and that on the surface of the electrode roller is also 800 Gs. The magnetic pole of the magnet member M6 for the photoreceptor drum P6 is set at an angle of 20° from the position closest to the electrode roller R6 toward the upstream side, while the magnetic pole of the magnet member MR6 for the electrode roller R6 is also set at an angle of 20° from the position closest to the photoreceptor drum P6 toward the downstream side. The photoreceptor drum P6 had a diameter of 30 mm, and was rotated at a circumferential speed of 60 mm/s.

The toner employed was prepared by mixing 5% of carbon black and 2% of oxycarbonic acid metallic complex with 93% of styrene acrylic resin, with further external addition of 0.4% of colloidal silica thereto (all in weight %). For the carrier, ferrite powder having an average particle diameter of 100 μm and coated by silicon resin on its surface was employed.

Still referring to FIG. 10, the functioning of the electrophotographic apparatus K6 having the construction as described above will be explained hereinafter.

Firstly, the surface of the photoreceptor drum P6 was changed to −500 V by the corona charger CH6 (impressed voltage −4 kV, voltage of the grid electrode G-500 V). The laser beam S was projected onto the surface of said photoreceptor drum P6 to form a electrostatic latent image thereon, with the exposure potential of the photoreceptor surface at that time being −100 V.

Onto the surface of said photoreceptor drum P6, the magnetic dual-component developing material Td was caused to adhere within the developing material hopper H6 by the magnetic force. Then, after restricting the thickness of the developing material layer to 1 mm by the restricting plate Tp, the surface of the photoreceptor drum P6 was caused to pass before the electrode roller R3, which was disposed through a distance of 1 mm with respect to the surface of the photoreceptor drum P6. During passing of the uncharged region of the photoreceptor drum an A.C. voltage (frequency 500 Hz) of 500 V 0-p (peak to peak voltage 1 kV) superposed with a D.C. voltage of +100 V was applied to the electrode roller R6 through a high voltage source V. Thereafter, during passing of the surface of the photoreceptor drum charged to −500 V and written with the latent image, an A.C. voltage (frequency 500 Hz) of −500 V 0-p (peak to peak voltage 1 kV) superposed with a D.C. voltage of −350 V was applied to the electrode roller R6 through the high voltage source V. Then, the developing material Td is subjected to rapid movement back and forth and toward left and right between the drum P6 and the electrode roller R6, ultimately a negative-positive reversed toner image was left only at the image portion on the surface of the photoreceptor drum P6. The toner adhering onto the surface of the electrode roller R6 rotating in a direction indicated by an arrow was scraped off therefrom by the scraper Ts so as to be returned into the hopper H6 again for use in the subsequent image formation. Then, after transferring the toner image thus obtained on the surface of the photoreceptor drum P6 onto a paper sheet (not shown) by the action of the transfer charger CT6, said toner image was thermally fixed on the paper sheet by a fixing device (not shown). As a result, a favorable image with extremely high resolution free from a trace of magnetic brush bristles of the developing material or scattering of toner, and reproducing the image of 32 lines/mm, could be obtained.

(Embodiment 7)

Figure 11:
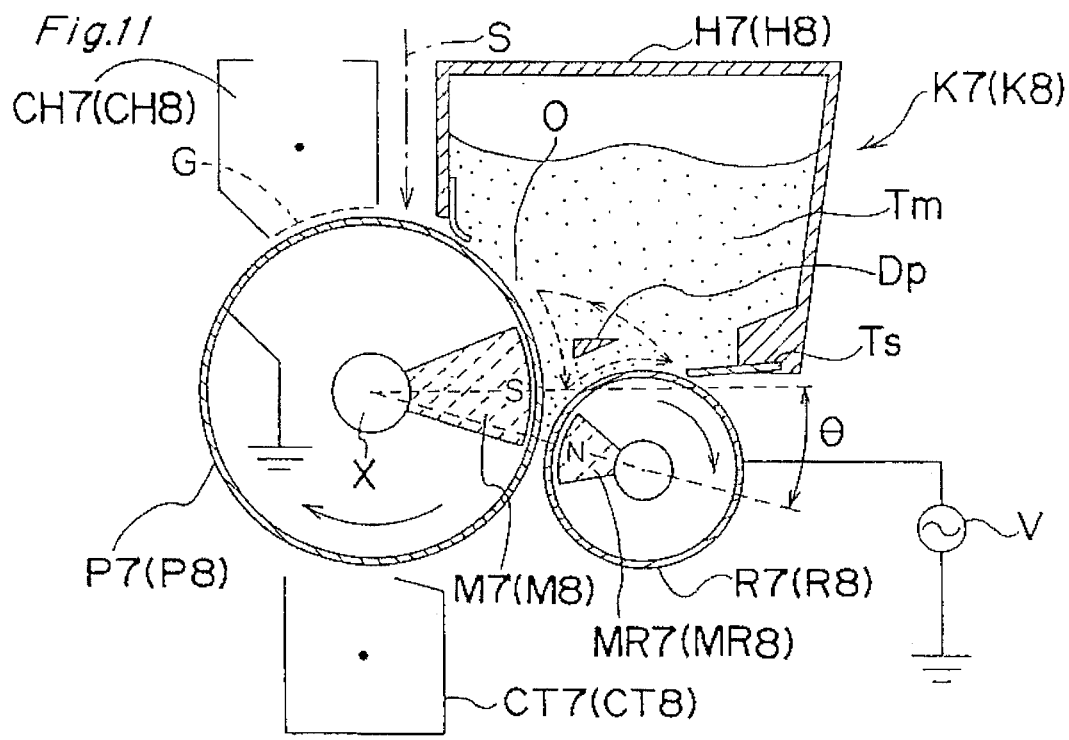
FIG. 11 is a view similar to FIG. 5, which particularly shows seventh and eighth embodiments of the present invention.

The electrophotographic apparatus K7 according to a seventh embodiment of the present invention as shown in FIG. 11 also includes an organic photoreceptor drum P7 formed by dispersing phthalocyanine into a polyester binder resin and rotatably supported by its axis X, a magnet member M7 fixed on the same shaft X for the photoreceptor drum P7, a corona charger CH7 provided to negatively charge the surface of the photoreceptor drum P7 and having a grid electrode G for controlling the charge potential of said photoreceptor drum, a developing material hopper H7 having an opening portion O adjacent to the surface of the photoreceptor drum P7 and accommodating therein a magnetic mono-component toner Tm, a non-magnetic electrode roller R7 provided at a lower portion of the hopper H7 in a position confronting the surface of the photoreceptor drum P7 through a predetermined gap, and applied with a high voltage by an A.C. high voltage source V, a magnet member MR provided within the electrode roller R7, a scraper Ts made of a polyester film provided to scrape off the developing material on the surface of the electrode roller R7, and a transfer corona charger CT7 for transferring a toner image formed on the surface of the photoreceptor drum P7 onto a paper sheet (not shown). In the developing material hopper H7 in a position above the gap between the photoreceptor drum P7 and the electrode roller R7, there is provided a damper Dp for smoothing the flow of the developing material within the developing material hopper H7, and also for preventing clogging of the developing material between said drum P7 and said roller R7 due to compression of the developing material by its weight. The flux density on the surface of the photoreceptor drum P7 is 600 Gs, while that on the surface of the electrode roller R7 is 800 Gs. By setting the magnetic force within the electrode roller R7 to be larger than that within the photoreceptor drum, the transportability has been improved. Meanwhile, the magnetic pole angle θ of the magnet member M7 in FIG. 11 is set to be 15°. The photoreceptor drum P7 had a diameter of 30 mm, and was rotated at a circumferential speed of 60 mm/s in the direction of an arrow, while the electrode roller R7 with a diameter of 16 mm was rotated at a circumferential speed of 40 mm/s in a direction opposite to the advancing direction of the photoreceptor drum P7 as indicated by another arrow. The gap between the photoreceptor drum P7 and the electrode roller R7 was set at 300 μm.

For the magnetic mono-component developing material, the fine particle insulative magnetic mono-component toner with an average particle diameter of 5 μm and prepared by 70% of polyester resin, 25% of ferrite, 3% of carbon black, and 2% of oxycarbonic acid metallic complex, with external addition of 1% of colloidal silica, was employed (all in weight %).

By the above arrangement for the seventh embodiment in FIG. 11, the surface of the photoreceptor drum P7 was charged to −500 V by the corona charger CH7 impressed voltage −4.5 kV, voltage of the grid electrode G-500 V). The laser beam S was projected onto the surface of said photoreceptor drum P7 to form an electrostatic latent image thereon, with the exposure potential of the photoreceptor surface at that time being −90 V. Onto the surface of said photoreceptor drum P7, the magnetic mono-component toner Tm was caused to adhere within the developing material hopper H7 by the magnetic force. Subsequently, the surface of the photoreceptor drum P7 to which the toner had adhered was caused to pass before the electrode roller R7. During passing of the uncharged region of the photoreceptor drum an A.C. voltage (frequency 1 kHz) of 750 V 0-p (peak to peak voltage 1.5 kV) superposed with a D.C. voltage of 0 V was applied to the electrode roller R7 through a high voltage source −V. Thereafter, during passing of the surface of the photoreceptor drum P7 charged to −500 V and written with the latent image, an A.C. voltage (frequency 1 kHz) of 750 V 0-p (peak to peak voltage 1.5 kV) superposed with a D.C. voltage of −350 V was applied to the electrode roller R7 through the high voltage source V. Then, the toner adhering to the charged portion of the photoreceptor drum P7 is collected onto the electrode roller R7, and a negative-positive reversed toner image was left only at the image portion on the surface of the photoreceptor drum P7. The toner stuck to the electrode roller R7 rotating in the direction of the arrow was scraped off by the scraper Ts and returned to the developing material hopper H7 for use in the subsequent image formation. The state of circulation of the toner in the hopper H7 is shown by broken-line arrows. The toner image thus obtained on the photoreceptor drum P7 was transferred onto a paper sheet (not shown), and then, thermally fixed thereon by a fixing device (not shown). As a result, a favorable image with high resolution free from turbulence in the lateral lines or scattering of toner, with uniform solid portions at a density of 1.5, and reproducing the image of 32 lines/mm, could be obtained.

(Embodiment 8)

Still referring to FIG. 11, an apparatus K8 for printing on an A4 size paper sheet as fed in a landscape position (printing width 210 mm) will be explained hereinafter as an eighth embodiment.

In this embodiment, the charging width on the surface of the photoreceptor drum P8 was set to 220 mm, and the magnetizing width of the magnet member M8 within the photoreceptor drum P8, to 216 mm. In this case, the adhering width of the toner on the surface of the photoreceptor drum P8 was about 216 mm. The magnetizing width of the magnet member MR8 provided within the electrode roller R8 was set to 214 mm. The photoreceptor drum P8 was rotated at a circumferential speed of 60 mm/s in the direction indicated by the arrow. The electrode roller R8 had a diameter of 16 mm, and was rotated in the direction opposite to the advancing direction of the photoreceptor drum P8 (i.e. in the direction indicated by the arrow in the drawing) at a circumferential speed of 80 mm/s. The gap between the photoreceptor drum P8 and the electrode roller R8 is set to be 300 μm.

For the magnetic mono-component developing material, the fine particle insulative magnetic mono-component toner was employed, which was composed of 70% of polyester resin, 25% of ferrite, 3% of carbon black, and 2% of oxycarbonic acid metallic complex, with further external addition of 1% of silica (all in weight %).

By the above arrangement of FIG. 11, the surface of the photoreceptor drum P8 was charged to −500 V by the corona charger CH8 (impressed voltage −4.5 kV, voltage of the grid electrode G-500 V). The laser beam S was projected onto the surface of said photoreceptor drum P8 to form an electrostatic latent image thereon, with the exposure potential of the photoreceptor surface at that time being −90 V. Onto the surface of said photoreceptor drum P8 the magnetic mono-component toner Tm was caused to adhere within the developing material hopper H8 by the magnetic force. Subsequently, the surface of the photoreceptor drum P8 to which the toner had adhered was caused to pass before the electrode roller R8. During passing of the uncharged region of the photoreceptor drum, an A.C. voltage (frequency 1 kHz) of 750 V 0-p (peak to peak voltage 1.5 kV) superposed with a D.C. voltage of 0 V was applied to the electrode roller R8 through a high voltage source V. Thereafter, during passing of the surface of the photoreceptor drum P8 charged to −500 V and written with the latent image, an A.C. voltage (frequency 1 kHz) of 750 V 0-p (peak to peak voltage 1.5 kV) superposed with a D.C. voltage of −350 V was applied to the electrode roller R8 through the high voltage source V. Then, the toner adhering to the charged portion of the photoreceptor drum P8 is collected onto the electrode roller R8, and a negative-positive reversed toner image was left only at the image portion on the surface of the photoreceptor drum P8. The toner stuck to the electrode roller R8 rotating in the direction of the arrow was scraped off by the scraper Ts and returned to the developing material hopper H8 for use in the subsequent image formation. The toner image thus obtained on the photoreceptor drum P8 was transferred onto a paper sheet (not shown), and then, thermally fixed thereon by a fixing device (not shown). As a result, since there was no possibility that the developing material magnetically adheres at the uncharged regions on the both ends of the photoreceptor drum, such toner never stuck to the both sides of the photoreceptor drum in a belt-like pattern, and the interior of the apparatus was free from soiling by the toner even after a number of paper sheets were continuously printed.

(Embodiment 9)

Figure 12:
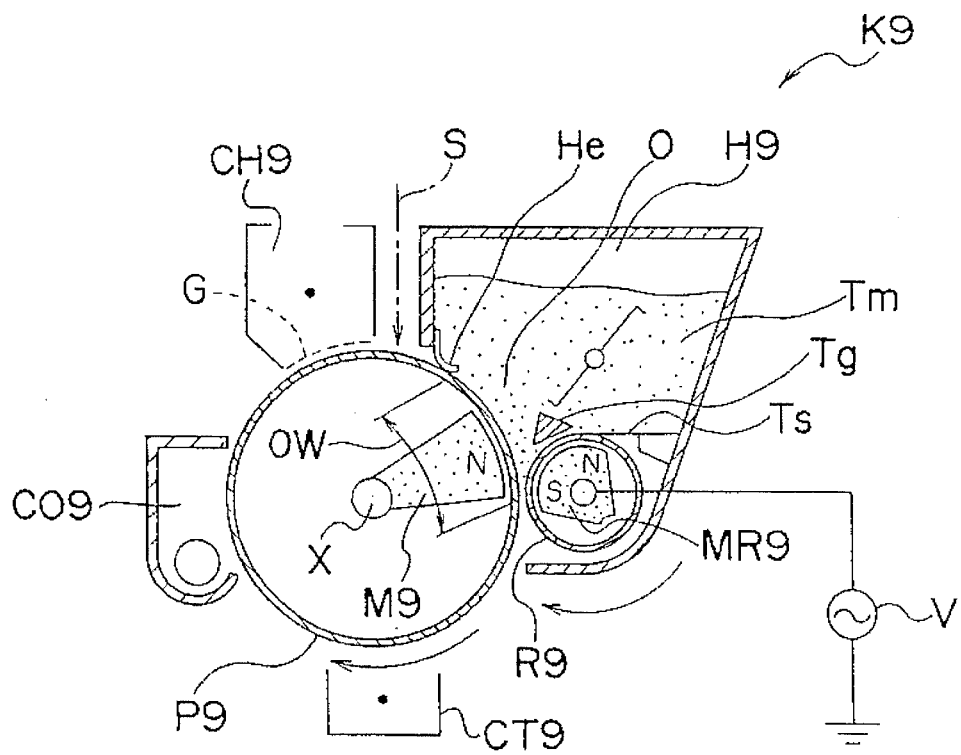
FIG. 12 is a view similar to FIG. 5, which particularly shows a ninth embodiment of the present invention.

The electrophotographic apparatus K9 according to a ninth embodiment as shown in FIG. 12, similarly includes an organic photoreceptor drum P9 formed by dispersing phthalocyanine into a polyester binder resin and rotatably supported by the axis X, a magnet member M9 fixed on the same shaft X for the photoreceptor drum P9 and provides the maximum flux density of 800 Gs on the surface of said drum P9, a corona charger CH9 provided to negatively charge the surface of the photoreceptor drum P9 and having a grid electrode G for controlling the charge potential of said photoreceptor drum P9, a developing material hopper H9 having an opening portion O adjacent to the surface of the photoreceptor drum P9 and accommodating therein a negatively charging magnetic mono-component toner Tm having an average particle diameter of 10 μm so as to be guided by a toner guide Tg, an electrode roller R9 of an aluminum material provided at a lower portion of the hopper H9 in a position confronting the surface of the photoreceptor drum P9 and enclosing therein a magnet member MR9, and applied with a high voltage by an A.C. high voltage source V, a scraper Ts made of a polyester film provided to scrape off the toner on the surface of the electrode roller R9, a transfer corona charger CT9 for transferring a toner image formed on the surface of the photoreceptor drum P9 onto a paper sheet (not shown), and a cleaner CO9 for cleaning toner remaining on the surface of the photoreceptor drum P9 after the transfer. The magnet member M9 is formed with the magnetic pole at its portion facing the developing material hopper H9. A width OW of the opening O of the hopper H9 confronting the surface of the photoreceptor drum D9 is set to be about 15 mm. The width OW referred to above is a distance from the closest position between the drum P9 and the roller R9 to the end portion He of the hopper H9 as measured along the surface of the photoreceptor drum P9, which had a diameter of 30 mm, and was rotated at a circumferential speed of 120 mm/s. Meanwhile, the electrode roller R9 was rotated in the direction indicated by the arrow at the circumferential speed of 100 μm/s.

The magnetic mono-component toner employed in the above case is prepared by 70% of polyester resin, 25% of ferrite, 3% of carbon black, and 2% of oxycarbonic acid metallic complex, with external addition of 0.4% of colloidal silica (all in weight %).

Still referring to FIG. 12, the functioning of the electrophotographic apparatus K9 having the construction as described above will be explained hereinafter.

In the first place, the surface of the photoreceptor drum P9 was charged to −500 V by the corona charger CH9 (impressed voltage −4 kV, voltage of the grid electrode G-500 V). The laser beam S was projected onto the surface of said photoreceptor drum P9 to form an electrostatic latent image thereon, with the exposure potential of the photoreceptor surface at that time −100 V. Onto the surface of said photoreceptor drum P9, the magnetic mono-component toner Tm was caused to adhere within the developing material hopper H9 by the magnetic force. At this time, the toner was charged to approximately −3μ C/g. Subsequently, the surface of the photoreceptor drum P9 to which the toner had adhered was caused to pass before the electrode roller R9, which was disposed through a distance of 300 μm with respect to the surface of the photoreceptor drum P9. To the electrode roller R9, an A.C. voltage (frequency 300 Hz) of 400 V 0-p (peak to peak voltage 800 V) superposed with a D.C. voltage of −300 V and having a waveform as shown in FIG. 6 was applied through a high voltage source V. The toner in a layer on the surface of the photoreceptor drum P9 moves between the drum P9 and the electrode roller R9, and the toner at the non-image portion was gradually shifted onto the side of the electrode roller R9, and thus, a negative-positive reversed toner image was left only at the image portion on the surface of the photoreceptor drum P9. The toner adhering onto the surface of the electrode roller R9 rotating in a direction indicated by the arrow was scraped off therefrom by the scraper Ts so as to be returned into the hopper H9 again for use in the subsequent image formation. Then, after transferring the toner image thus obtained on the surface of the photoreceptor drum P9 onto a paper sheet (not shown) by the action of the transfer charger CT9, said toner image was thermally fixed on the paper sheet by a fixing device (not shown). The surface of the photoreceptor drum P9 after the transfer is cleaned by the cleaner CO9, and was again charged by the corona charger CH9 for use in the subsequent image forming process, as a result of which a sharp image free from scattering of toner could be obtained. (Embodiment 10)

Figure 13:
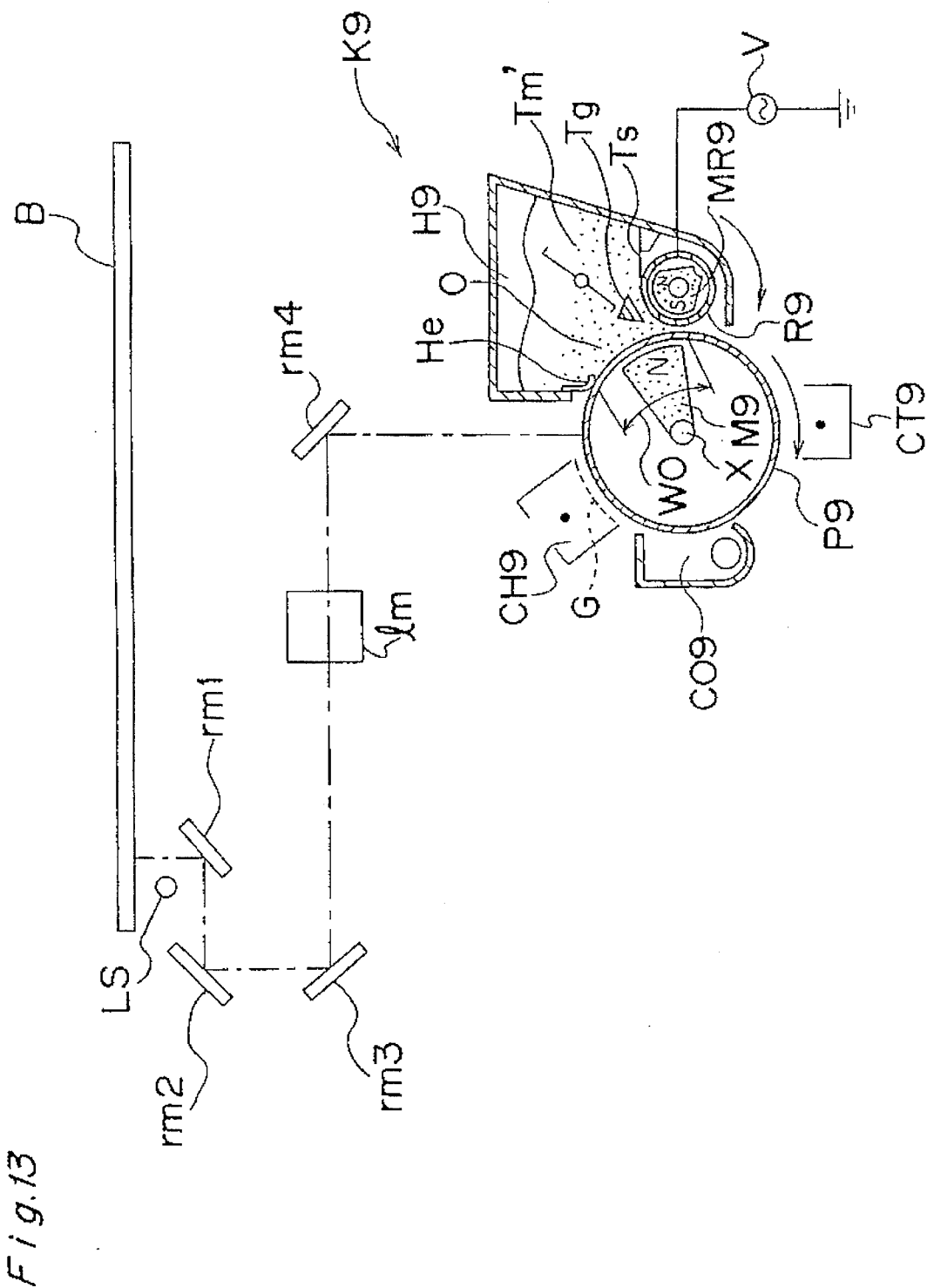
FIG. 13 is a schematic diagram showing a tenth embodiment of the present invention, in which the electrophotographic apparatus of FIG. 12 is applied to an analog copying apparatus.

Referring further to FIG. 13, there is shown a tenth embodiment in which the electrophotographic apparatus K9 of the present invention was applied to an analog copying apparatus. The arrangement of FIG. 13 is different from that of FIG. 12 in that an optical system for exposure of the photosensitive surface of the photoreceptor drum P9 is shown, the toner Tm' has a charging characteristic opposite in polarity to that of the photoreceptor drum P9, and the voltage to be applied to the electrode roller R9 is different from that in FIG. 12. Other constructions similar to those in FIG. 12 are designated by like reference numerals for brevity of explanation. The toner Tm' employed was prepared by mixing 25% of ferrite, 5% of carbon black, and 2% of nigrosine dye with 68% of styrene acrylic resin, with further external addition of 0.1% of colloidal silica thereto (all in weight %).

In FIG. 13, the surface of the photoreceptor drum P9 is charged in the similar manner as described earlier with reference to FIG. 12. When an original document (not shown) disposed on a transparent document platen B is scanned through a constant speed reflecting mirror rm1 and half-speed reflecting mirrors rm2 and rm3, with the original document placed on the platform B being illuminated by a light source LS provided below and adjacent to said platform B, light reflected from the original document is focused on the surface of the photoreceptor drum P9 through a lens assembly lm and another reflecting mirror rm4 so as to form an electrostatic latent image as the photoreceptor drum is moved.

Figure 14:
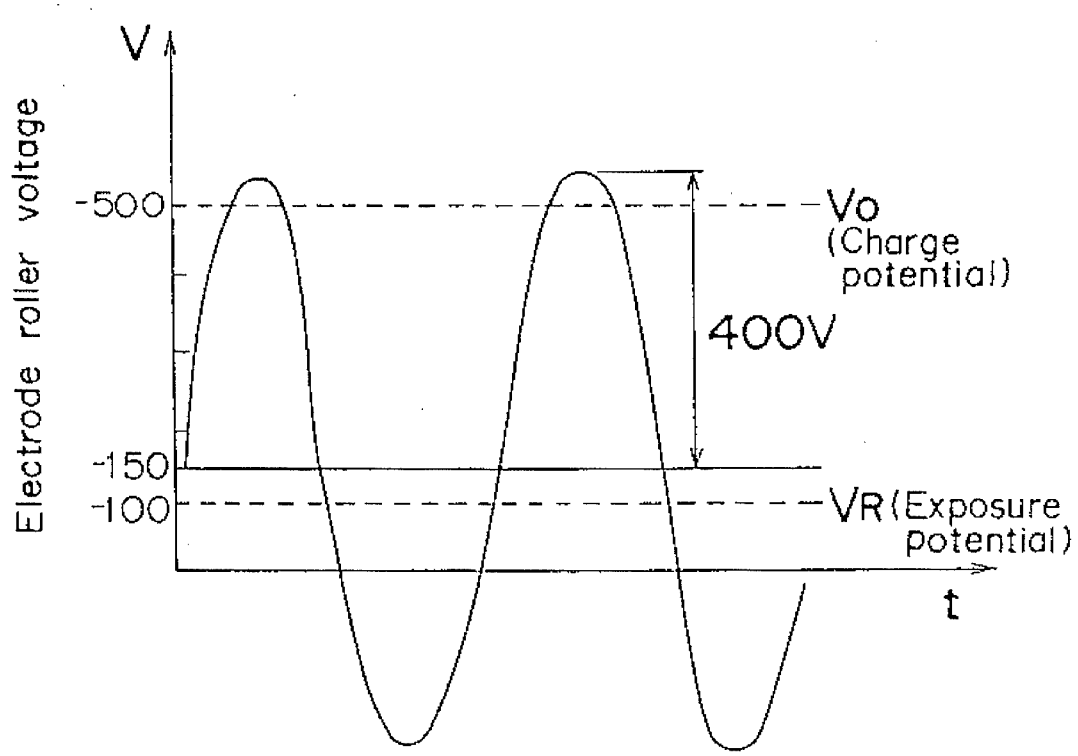
FIG. 14 is a schematic diagram showing waveforms of A.C. voltages to be employed in the tenth embodiment of the present invention.

When the surface of the photoreceptor drum D9 formed with a latent image is passed through the toner Tm' said toner is attracted onto the surface of said photoreceptor drum P9, and upon further passing thereof by the electrode roller R9, only the toner at the image portion passes through the electrode roller R9 without being attracted thereby, and thus, a regular positive toner image was obtained on the surface of the photoreceptor drum P9. In this case, the voltage to be applied to the electrode roller R9 is different from the case as referred to earlier with reference to FIG. 12, and is of an A.C. voltage (frequency 300 Hz) at 400 V 0-p (peak to peak voltage 800 V) superposed with a D.C. voltage of −150 V as shown in FIG. 14. After transferring the toner image thus obtained on the surface of the photoreceptor drum P9 onto a paper sheet (not shown) by the action of at the transfer charger CT9, said toner image was thermally fixed on the paper sheet by a fixing device (not shown). The surface of the photoreceptor drum P9 after the transfer is cleaned by the cleaner CO9, and was again charged by the corona charger CH9 for use in the subsequent image forming process, as a result of which a sharp image free from scattering of toner could be obtained.

It is to be noted here that, in the above embodiment, although the mono-component magnetic toner was described as employed, the present invention is not limited its application to such mono-component magnetic toner alone, but may be readily applied to the dual-component magnetic developing material as well to obtain the similar effect.

Although the present invention has been fully described by way of example with reference to the accompanying drawing, it is to be noted here that various changes and modifications will be apparent to those skilled in the art. Therefore, unless otherwise such changes and modifications depart from the scope of the present invention, they should be construed as included therein.

What is claimed is:

1. An electrophotographic method which comprises:
   a first step for causing a magnetic developing material to magnetically adhere onto a total surface of an electrostatic latent image holding member by moving the latent image holding member enclosing therein a fixed magnet A emitting magnetic force to attract the magnetic developing material so as to pass through a developing material hopper containing therein the magnetic developing material; and
   a second step for removing unnecessary magnetic developing material from the surface of said latent image holding member by confronting said latent image holding member with a rotating electrode roller having therein another magnet B of a polarity opposite to that of said fixed magnet A and provided through a gap with respect to the surface of said latent image holding member, said electrode roller being applied with an A.C. voltage in said second step so as to displace and collect the unnecessary magnetic developing material on the surface of said latent image holding member.

2. An electrophotographic apparatus which comprises:

a movable electrostatic latent image holding member enclosing a fixed magnet means therein emitting magnetic force to attract magnetic developing material;

a supply means for supplying magnetic developing material onto a total surface of said latent image holding member;

a rotating electrode roller disposed at a position confronting at least part of said fixed magnet means through a predetermined gap with respect to the surface of said latent image holding member, and rotating in a direction opposite to the direction of rotation of said latent image holding member; and further a voltage impressing means for impressing a voltage for removing toner at a non-image portion on said latent image holding member, to said rotating electrode roller.

3. An electrophotographic apparatus which comprises:

a movable electrostatic latent image holding member enclosing a fixed magnet means therein emitting magnetic force to attract magnetic developing material;

a latent image forming means for forming an electrostatic latent image on said latent image holding member;

a developing material hopper confronting said latent image holding member and containing magnetic developing material therein so as to cause the developing material to be magnetically attracted and adhere onto a total surface of said latent image holding member by an action of said fixed magnet means; and a rotating electrode roller provided through a gap with respect to the surface of said latent image holding member so as to be applied with an A.C. voltage, and rotating in a direction of advance opposite to that of said latent image holding member, wherein position of magnetic poles of said magnet means within said latent image holding member is at an upstream side from a position closest to said latent image holding member with respect to said rotating electrode roller.

4. An electrophotographic apparatus which comprises:

a movable electrostatic latent image holding member enclosing a fixed magnet A therein emitting magnetic force to attract magnetic developing material;

a latent image forming means for forming an electrostatic latent image on said latent image holding member;

a developing material hopper confronting said latent image holding member and containing magnetic developing material therein so as to cause the developing material to be magnetically attracted and adhere onto a total surface of said latent image holding member by an action of said fixed magnet A; and a rotating electrode roller for removing toner at a non-image portion on said latent image holding member, wherein said rotating electrode roller is constituted by a non-magnetic member enclosing therein another magnet B having polarity opposite to that of said magnet A, position of magnetic poles of said magnet A within said latent image holding member is at an upstream side from a position closest to said latent image holding member with respect to said electrode roller, with position of magnetic poles of said magnet B within said electrode roller being at one of 1) the closest position between said latent image holding member and said electrode roller and 2) at a downstream side therefrom, and said rotating electrode roller is provided through a gap with respect to the surface of said latent image holding member, and applied with an A.C. voltage.

5. An electrophotographic apparatus which comprises:

a movable electrostatic latent image holding member enclosing a fixed magnet means therein emitting magnetic force to attract magnetic developing material;

a latent image forming means for forming an electrostatic latent image on said latent image holding member;

a developing material hopper confronting said latent image holding member and containing magnetic developing material therein so as to cause the developing material to be magnetically attracted and adhere onto a total surface of said latent image holding member by an action of said fixed magnet means; and a rotating electrode roller for removing toner at a non-image portion on said latent image holding member, wherein said rotating electrode roller provided through a gap with respect to the surface of said latent image holding member is applied with an A.C. voltage, and rotating in its proceeding direction opposite to that of said latent image holding member, with its moving speed being equal to or slower than that of said latent image holding member.

6. An electrophotographic apparatus which comprises:

a movable electrostatic latent image holding member enclosing a fixed magnet means therein emitting magnetic force to attract magnetic developing material;

a toner hopper confronting said latent image holding member for supplying magnetic toner by causing said magnetic toner to be magnetically attracted onto a total surface of said latent image holding member by an action of said fixed magnet means; and a rotating toner collecting electrode roller provided through a gap with respect to the surface of said latent image holding member at a downstream side in a moving direction of said electrostatic latent image holding member so as to be applied with an alternating current voltage for collecting unnecessary toner and rotated in a direction opposite to a moving direction of said electrostatic latent image holding member, said toner hopper having a width larger than 5 mm at its open portion confronting said latent image holding member in the direction of movement by said latent image holding member.

7. An electrophotographic method which comprises:

a step for forming an electrostatic latent image on an electrostatic latent image holding member enclosing therein a first fixed magnet means emitting magnetic force to attract magnetic developing material and, thereafter, moving said electrostatic latent image holding member;

a step for causing the electrostatic latent image holding member to pass through a toner hopper containing magnetic toner therein for adhesion of the magnetic toner onto a surface of said electrostatic latent image holding member by a magnetic force of said first fixed magnet means;

a step for removing the magnetic toner adhering to a non-image portion of the electrostatic latent image holding member so as to leave the magnetic toner adhering to an image portion by causing the electrostatic latent image holding member to pass through a rotatable toner collecting electrode roller disposed close to the electrostatic latent image holding member holding the magnetic toner through a gap and enclosing therein a second fixed magnet means and applied with an alternating current voltage, under an influence of an electrostatic force and a magnetic force by the second fixed magnet means;

a step for removing the magnetic toner collected by said toner collecting electrode roller so as to be returned to said toner hopper again; and a step for transferring the magnetic toner at the image portion remaining on said electrostatic latent image holding member, onto an image receptor.

8. An electrophotographic method of a reversal development type for use in an electrophotographic apparatus including a movable electrostatic latent image holding member enclosing a fixed magnet therein emitting magnetic force to attract a magnetic developing material, and a developing material hopper having the magnetic developing material, said electrophotographic method comprising:

providing a rotating electrode roller disposed through a gap with respect to the electrostatic latent image holding member and enclosing therein a fixed magnet;

a charging step for charging said electrostatic latent image holding member;

a latent image forming step for forming an electrostatic latent image on a surface of said latent image holding member through exposure; and a developing step for thereafter causing the magnetic developing material to adhere to a total surface of the electrostatic latent image holding member by magnetically attracting the magnetic developing material onto the surface of said electrostatic latent image by confronting the developing material with respect to said electrode roller for forming an electric field between said electrode roller and said electrostatic latent image holding member;

wherein impression of voltage for developing by toner is effected during passing of a charged area of the latent image holding member through a confronting position thereof with respect to said electrode roller.

9. An electrophotographic apparatus which comprises:

a movable electrostatic latent image holding member enclosing a fixed magnet therein emitting magnetic force to attract magnetic developing material;

a developing material hopper for supplying magnetic developing material onto a total surface of said latent image holding member;

a rotating electrode roller disposed at a position confronting at least part of said fixed magnet, through a predetermined gap with respect to the surface of said latent image holding member, and made of a magnetic material; and a voltage impressing means for impressing a voltage for removing toner at a non-image portion on said latent image holding member, to said electrode roller.

* * * * *